(12) United States Patent
Kobayashi

(10) Patent No.: US 10,909,898 B2
(45) Date of Patent: Feb. 2, 2021

(54) FIELD-SEQUENTIAL IMAGE DISPLAY DEVICE AND IMAGE DISPLAY METHOD

(71) Applicant: SHARP KABUSHIKI KAISHA, Sakai (JP)

(72) Inventor: Masamitsu Kobayashi, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 239 days.

(21) Appl. No.: 16/096,671

(22) PCT Filed: Apr. 19, 2017

(86) PCT No.: PCT/JP2017/015684
§ 371 (c)(1),
(2) Date: Oct. 25, 2018

(87) PCT Pub. No.: WO2017/188081
PCT Pub. Date: Nov. 2, 2017

(65) Prior Publication Data
US 2020/0327840 A1    Oct. 15, 2020

(30) Foreign Application Priority Data
Apr. 26, 2016 (JP) .................................. 2016-088210

(51) Int. Cl.
*G09G 5/00* (2006.01)
*G09G 3/20* (2006.01)
*G09G 3/36* (2006.01)

(52) U.S. Cl.
CPC ............ *G09G 3/2003* (2013.01); *G09G 3/36* (2013.01); *G09G 2320/0626* (2013.01)

(58) Field of Classification Search
CPC .. G09G 5/10; G09G 5/02; G09G 3/30; G09G 3/36; G09G 5/00; G11C 19/00; G06F 3/038
See application file for complete search history.

(56) References Cited

U.S. PATENT DOCUMENTS 7,277,075 B1    10/2007  Hirano et al.
2008/0180384 A1*  7/2008  Aoki .................... G09G 3/3607
                                                       345/102

(Continued)

FOREIGN PATENT DOCUMENTS

JP    2001-147666 A    5/2001
JP    2008-139809 A    6/2008

*Primary Examiner* — Pegeman Karimi
(74) *Attorney, Agent, or Firm* — ScienBiziP, P.C.

(57) ABSTRACT

An image display device includes an image data conversion unit that performs conversion processing of input image data and a display unit that displays a plurality of subframes, in one frame period. In the image data conversion unit, the conversion processing is performed in a manner that, for each pixel, a hue and a saturation of the input image data and a hue and a saturation of driving image data in an HSV color space are held to be respectively equal to each other, color components of the driving image data are set to have the same value when the saturation of the input image data is equal to the minimum saturation, and when the saturation of the input image data is equal to the maximum saturation, the color components of the input image data are multiplied by the same value, and then the input image data is compressed.

21 Claims, 17 Drawing Sheets

(56) References Cited

U.S. PATENT DOCUMENTS

2014/0028739 A1* 1/2014 Takahashi ............ G09G 3/3648
                                                        345/690
2016/0247427 A1* 8/2016 Fan ..................... G09G 3/006
2018/0053474 A1* 2/2018 Miyata ................. G09G 3/3688

* cited by examiner

FIELD-SEQUENTIAL IMAGE DISPLAY DEVICE AND IMAGE DISPLAY METHOD

TECHNICAL FIELD

The present invention relates to an image display device, and particularly, to a field sequential type image display device and a field sequential type image display method.

BACKGROUND ART

Conventionally, a field sequential type image display device that displays a plurality of subframes in one frame period is known. For example, a typical field sequential type image display device includes a backlight including a red light source, a green light source, and a blue light source, and displays red, green, and blue subframes in one frame period. When a red subframe is displayed, a display panel is driven based on red image data, and the red light source emits light. A green subframe and a blue subframe are displayed in the similar manner. Three subframes displayed in a time division manner are combined on the retinae of an observer by an afterimage phenomenon, and thus the observer recognizes these subframes as one color image.

In the field sequential type image display device, when the eyeline of the observer moves in a display screen, a situation in which the observer looks as if the colors of the subframes are separated from each other may occur (this phenomenon is referred to as color breakup). In order to suppress the occurrence of color breakup, an image display device that displays a white subframe in addition to the red, green, and blue subframes is known. An image display device that performs amplification processing of multiplying input image data by one or more coefficients when driving image data including red image data, green image data, blue image data, and white image data is obtained based on the input image data including red image data, green image data, and blue image data is known.

As the related art, PTLs 1 and 2 disclose a method of obtaining driving image data including red image data, green image data, blue image data, and white image data based on input image data including red image data, green image data, and blue image data, in an image display device which includes subpixels of red, green, and blue colors and is not the field sequential type.

CITATION LIST

Patent Literature

PTL 1: Japanese Unexamined Patent Application Publication No. 2001-147666
PTL 2: Japanese Unexamined Patent Application Publication No. 2008-139809

SUMMARY OF INVENTION

Technical Problem

A field sequential type image display device displays one subframe in one subframe period. The length of one subframe period is a fraction of the length of one frame period. Therefore, in a case where a response rate of a pixel is slow, luminance of the pixel may slowly change in each subframe period, and thus it may not be possible to accurately express the color corresponding to input image data (deterioration of color reproduction). This problem significantly appears when a gradation image is displayed.

PTLs 1 and 2 discloses the image display device which is not the field sequential type. Therefore, it is not possible to solve the problem of deterioration of color reproduction caused by insufficiency of a response rate in a pixel in a field sequential type image display device, even by using the method disclosed in these literatures.

Thus, an object of the present invention is to provide a field-sequential image display device and a field-sequential image display method in which high color reproduction is provided, and it is possible to prevent distortion of an image when a gradation image is displayed.

Solution to Problem

The object can be achieved, for example, by a field sequential type image display device as follows. An image display device includes an image data conversion unit that obtains driving image data corresponding to a plurality of subframes including a common color subframe, based on input image data corresponding to a plurality of color components, and a display unit that displays the plurality of subframes based on the driving image data, in one frame period. The image data conversion unit performs conversion processing of converting first image data corresponding to the plurality of color components into second image data corresponding to the plurality of subframes, for each pixel. The conversion processing is performed in a manner that, for each pixel, a hue and a saturation of the first image data and a hue and a saturation of the second image data in an HSV color space are held to be respectively equal to each other, color components of the second image data are set to have the same value when the saturation of the first image data is equal to a minimum saturation, and, when the saturation is equal to a maximum saturation, the color components of the first image data are multiplied by the same value, and then the first image data is compressed.

The object can be achieved, for example, by a field sequential type image display method as follows. An image display method includes a step of obtaining driving image data corresponding to a plurality of subframes including a common color subframe, based on input image data corresponding to a plurality of color components, and a step of displaying the plurality of subframes based on the driving image data, in one frame period. In the step of obtaining the driving image data, conversion processing of converting first image data corresponding to the plurality of color components into second image data corresponding to the plurality of subframes is performed for each pixel. The conversion processing is performed in a manner that, for each pixel, a hue and a saturation of the first image data and a hue and a saturation of the second image data in an HSV color space are held to be respectively equal to each other, color components of the second image data are set to have the same value when the saturation of the first image data is equal to a minimum saturation, and, when the saturation is equal to a maximum saturation, the color components of the first image data are multiplied by a same value, and then the first image data is compressed.

Advantageous Effects of Invention

According to such a field sequential type image display device or a field sequential type image display method, in the field sequential type image display device, while hues of image data before conversion and image data after the conversion are held to have the same value, and saturations of the image data before the conversion and image data after the conversion are held to have the same value, the color components of the image data after the conversion are set to have the same value when the saturation is the minimum, and, when the saturation is the maximum, the image data before the conversion is multiplied by the same value, and then the image data is compressed. Thus, it is possible to suitably limit a range of the image data and to improve color reproduction.

DESCRIPTION OF EMBODIMENTS

Hereinafter, image display devices and image display methods according to embodiments will be described with reference to the drawings. Firstly, the following is noted. "Computation" provided in the following descriptions includes the meaning that "a computation result is stored in a table in advance, and the computation result is obtained based on the table", in addition to the meaning of "obtaining a computation result with a computing machine".

Figure 1:
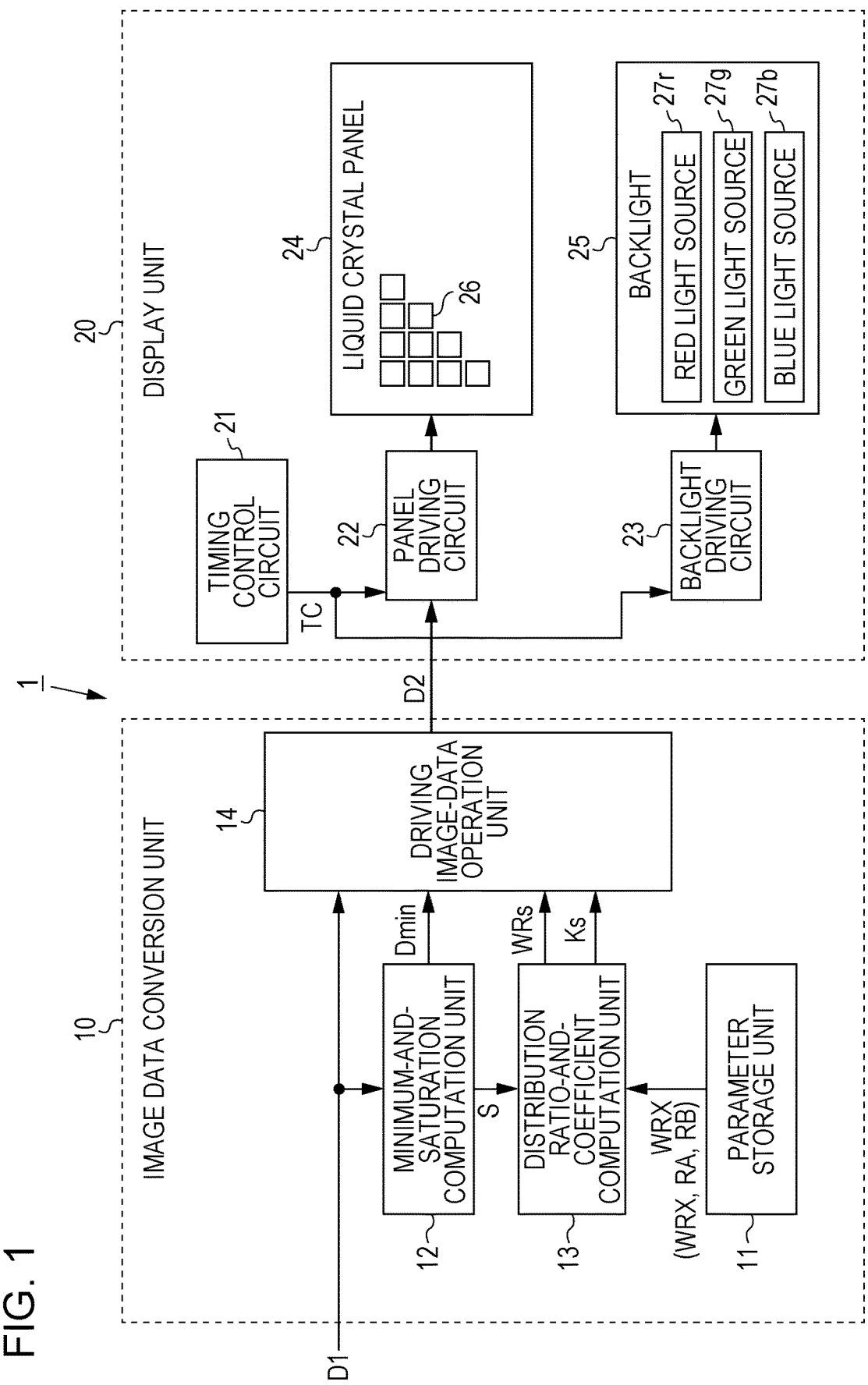
FIG. 1 is a block diagram illustrating a configuration of an image display device according to a reference example and a first embodiment.

Ahead of describing an image display device according to an embodiment, an image display device according to a reference example will be described. FIG. 1 is a block diagram illustrating a configuration of the image display device according to the reference example. An image display device 1 illustrated in FIG. 1 includes an image data conversion unit 10 and a display unit 20. The image data conversion unit 10 includes a parameter storage unit 11, a minimum value-and-saturation computation unit 12, a distribution ratio-and-coefficient computation unit 13, and a driving image-data operation unit 14. The display unit 20 includes a timing control circuit 21, a panel driving circuit 22, a backlight driving circuit 23, a liquid crystal panel 24, and a backlight 25.

The image display device 1 is a color-field sequential liquid crystal display apparatus. The image display device 1 divides one frame period into a plurality of subframe periods and displays different subframes in the subframe periods. Hereinafter, it is assumed that the image display device 1 divides one frame period into four subframe periods and respectively displays white, blue, green, and red subframes in first to fourth subframe periods. In the image display device 1, a white subframe is a common color subframe.

Input image data D1 including red image data, green image data, and blue image data is input to the image display device 1. The image data conversion unit 10 obtains driving image data D2 corresponding to white, blue, green, and red subframes, based on the input image data D1. The processing is referred to as "image-data conversion processing" below. Pieces of the driving image data D2 corresponding to white, blue, green, and red subframes are referred to as "white image data, blue image data, green image data, and red image data which are included in the driving image data D2", respectively. The display unit 20 displays the white, blue, green, and red subframes based on the driving image data D2, in one frame period.

The timing control circuit 21 outputs a timing control signal TC to the panel driving circuit 22 and the backlight driving circuit 23. The panel driving circuit 22 drives the liquid crystal panel 24 based on the timing control signal TC and the driving image data D2. The backlight driving circuit 23 drives the backlight 25 based on the timing control signal TC. The liquid crystal panel 24 includes a plurality of pixels 26 arranged in two dimensions. The backlight 25 includes a red light source 27r, a green light source 27g, and a blue light source 27b. The backlight 25 may include a white light source. For example, a light emitting diode (LED) is used as the light source 27.

In the first subframe period, the panel driving circuit 22 drives the liquid crystal panel 24 based on white image data included in the driving image data D2, and the backlight driving circuit 23 causes the red light source 27r, the green light source 27g, and the blue light source 27b to emit light. Thus, a white subframe is displayed. In a case where the backlight 25 includes a white light source, the backlight driving circuit 23 may cause the white light source to emit light in the first subframe period.

In the second subframe period, the panel driving circuit 22 drives the liquid crystal panel 24 based on blue image data included in the driving image data D2, and the backlight driving circuit 23 causes the blue light source 27b to emit light. Thus, a blue subframe is displayed. In the third subframe period, the panel driving circuit 22 drives the liquid crystal panel 24 based on green image data included in the driving image data D2, and the backlight driving circuit 23 causes the green light source 27g to emit light. Thus, a green subframe is displayed. In the fourth subframe period, the panel driving circuit 22 drives the liquid crystal panel 24 based on red image data included in the driving image data D2, and the backlight driving circuit 23 causes the red light source 27r to emit light. Thus, a red subframe is displayed.

Details of the image data conversion unit 10 will be described below. Red image data, green image data, and blue image data which are included in the input image data D1 are luminance data normalized to have a value of 0 to 1. When pieces of image data of three colors are equal to each other, the pixel 26 becomes achromatic. Red image data, green image data, and blue image data which are included in the driving image data D2 are also luminance data normalized to have a value of 0 to 1.

In the image-data conversion processing, white image data (having a value to be distributed to a common color subframe) included in the driving image data D2 is determined in a range of 0 to the minimum value of the pieces of image data of the three colors, which are included in the input image data D1. A distribution ratio WRs is a ratio of white image data to the maximum value (minimum value of the pieces of image data of the three colors) which may be taken by the white image data. This maximum value is obtained for each pixel. For example, in a case where the distribution ratio WRs is determined to be 0.6 when red image data included in input image data D1 is 0.5, and green image data and blue image data are 1, white image data included in driving image data D2 is 0.3.

The parameter storage unit 11 stores a parameter used in image-data conversion processing. The parameter storage unit 11 according to the reference example stores a parameter WRX in accordance with response characteristics of the pixel 26 provided in the liquid crystal panel 24 of the display unit 20. The parameter WRX takes a value in a range of $0 \leq WRX \leq 1$. The minimum value-and-saturation computation unit 12 obtains the minimum value Dmin and a saturation S for each pixel, based on the input image data D1. The distribution ratio-and-coefficient computation unit 13 obtains a distribution ratio WRs and a coefficient Ks used in amplification and compression processing, based on the saturation S and the parameter WRX. The driving image-data operation unit 14 obtains driving image data D2 based on the input image data D1, the minimum value Dmin, the distribution ratio WRs, and the coefficient Ks.

Figure 2:
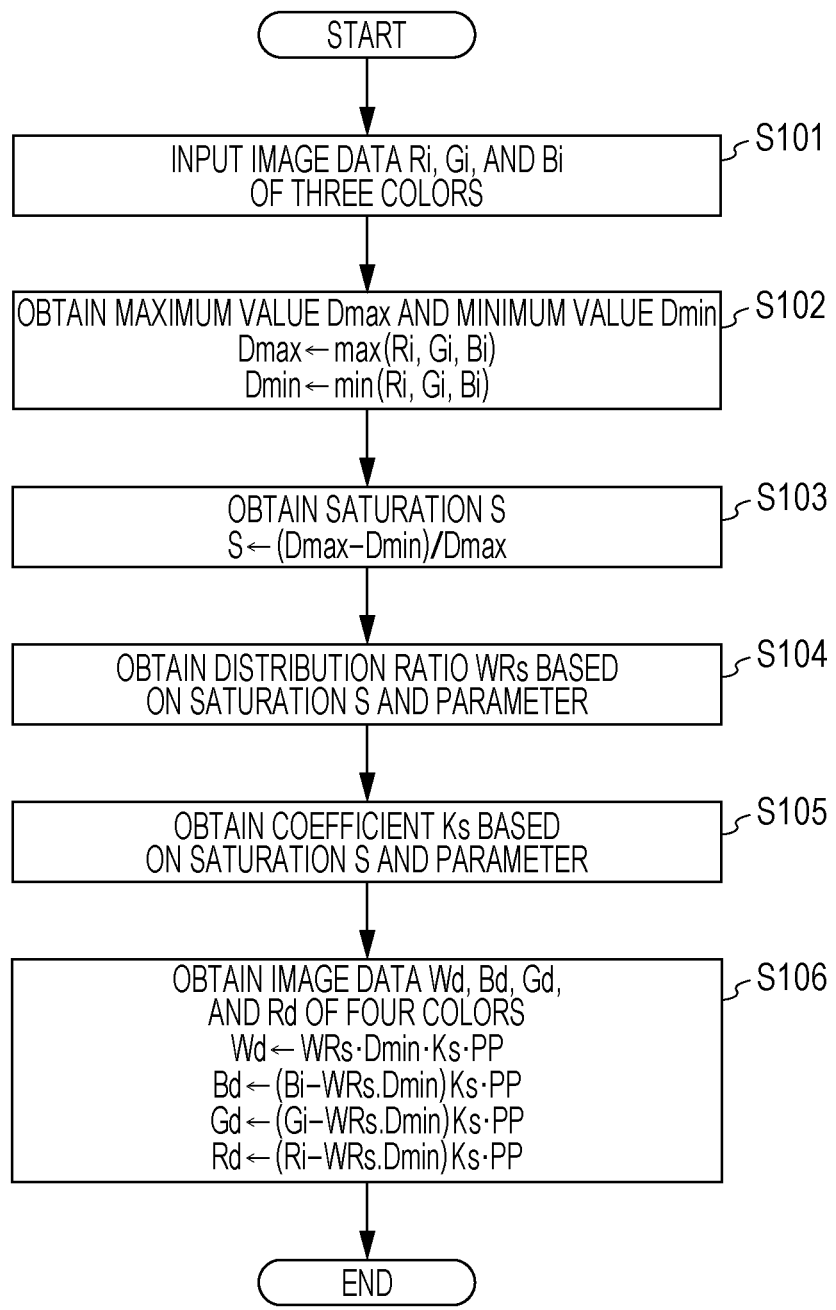
FIG. 2 is a flowchart illustrating image-data conversion processing of the image display device according to the reference example and the first embodiment.

FIG. 2 is a flowchart illustrating image-data conversion processing. The processing illustrated in FIG. 2 is performed on data of each pixel, which is included in input image data D1. Processing on image data Ri, Gi, and Bi of three colors will be described below on the assumption that red image data, green image data, and blue image data of a pixel, which are included in input image data D1 are respectively set as Ri, Gi, and Bi, and white image data, blue image data, green image data, and red image data of the pixel, which are included in driving image data D2 are respectively set as Wd, Bd, Gd, and Rd.

As illustrated in FIG. 2, the image data Ri, Gi, and Bi of three colors are input to the image data conversion unit 10 (Step S101). Then, the minimum value-and-saturation computation unit 12 obtains the maximum value Dmax and the minimum value Dmin of the image data Ri, Gi, and Bi of the three colors (Step S102). Then, the minimum value-and-saturation computation unit 12 obtains a saturation S bthe following expression (1), based on the maximum value Dmax and the minimum value Dmin (Step S103).

$$S=(Dmax-Dmin)/Dmax \quad (1)$$

Here, in the expression (1), S is set to 0 when Dmax is 0.

The distribution ratio-and-coefficient computation unit 13 obtains a distribution ratio WRs by a calculation expression (which will be described later), based on the saturation S and the parameter WRX (Step S104). The distribution ratio-and-coefficient computation unit 13 obtains a coefficient Ks by a calculation expression (which will be described later), based on the saturation S and the parameter WRX (Step S105). When the distribution ratio-and-coefficient computation unit obtains the distribution ratio WRs in Step S104, and then obtains the coefficient Ks in Step S105, the distribution ratio-and-coefficient computation unit 13 obtains the maximum value (or a value equal to or smaller than the maximum value) which may be taken by the coefficient Ks with the distribution ratio WRs under a condition in which the maximum value Dmax of the input image data D1 is set to be the maximum value of 1 which may be taken by the input image data D1.

The driving image-data operation unit 14 obtains image data Wd, Bd, Gd, and Rd of four colors by the following expressions (2a) to (2d), based on the image data Ri, Gi, and Bi of the three colors, the minimum value Dmin, the distribution ratio WRs, and the coefficient Ks (Step S106).

$$Wd=WRs \cdot Dmin \cdot Ks \cdot PP \quad (2a)$$

$$Bd=(Bi-WRs \cdot Dmin)Ks \cdot PP \quad (2b)$$

$$Gd=(Gi-WRs \cdot Dmin)Ks \cdot PP \quad (2c)$$

$$Rd=(Ri-WRs \cdot Dmin)Ks \cdot PP \quad (2d)$$

Here, in the expressions (2a) to (2d), PP indicates a value (P/Pmax) obtained by dividing the maximum value P for image data constraint by the maximum value Pmax (=1) which may be set for the image data. PP is also used in a tone compression method in which the saturation S is not considered. In the following descriptions, PP=1 is assumed. In a case of PP≠1, outputting the maximum luminance when S is 0 is not possible.

Details of Steps S104 and S105 will be described below. The saturation S and the distribution ratio WRs take values of 0 to 1. The maximum value of blue image data Bd, green image data Gd, and red image data Rd which are included in the driving image data D2 is set as Ddmax, and the minimum value thereof is set as Ddmin. When PP is 1, Wd, Ddmax, and Ddmin are given by the following expressions (3a) to (3c), respectively.

$$Wd = WRs \cdot Dmin \cdot Ks \quad (3a)$$

$$Ddmax = (Dmax - WRs \cdot Dmin)Ks \quad (3b)$$

$$Ddmin = (Dmin - WRs \cdot Dmin)Ks \quad (3c)$$

The following expression (4a) is derived by solving the expression of Wd>Ddmax in consideration of Dmax=Dmin/(1−S). The following expression (4b) is derived by solving the expression of Wd<Ddmin.

$$WRs > 1/\{2(1-S)\} \quad (4a)$$

$$WRs < \tfrac{1}{2} \quad (4b)$$

Figure 3:
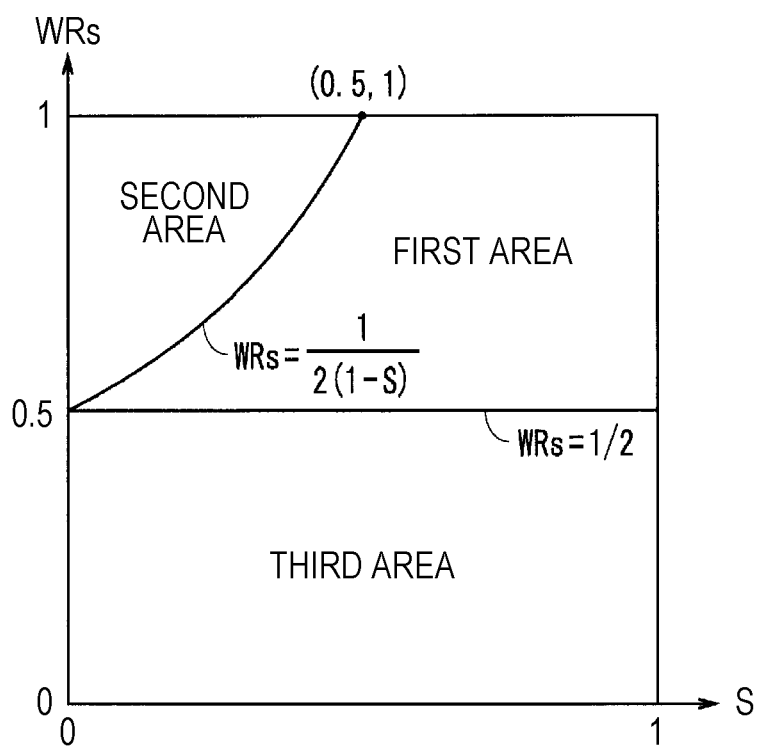
FIG. 3 is a diagram illustrating a range of a saturation and a distribution ratio in the image display device according to the reference example and the first embodiment.

FIG. 3 is a diagram illustrating the range of the saturation S and the distribution ratio WRs. The range of (S, WRs) illustrated in FIG. 3 is divided into a first area in which Ddmin<Wd<Ddmax is satisfied, a second area in which Ddmax<Wd is satisfied, and a third area in which Wd<Ddmin is satisfied.

In a case where (S, WRs) is in the first or third area, the expression of Wd<Ddmax is established. The following expression (5a) is derived by substituting Dmin=Dmax(1−S) into the expression (3b) and solving the expression of Ddmax≤1.

$$Ks \le 1/[Dmax\{1 - WRs(1-S)\}] \quad (5a)$$

The coefficient Ks is determined as with the following expression (5b) so as to establish the expression (5a) even when Dmax is 1 (maximum value which may be taken by the input image data D1). The expression (5b) shows the maximum value which may be taken by the coefficient Ks under a condition of Dmax=1, in a case where (S, WRs) is in the first or the third area.

$$Ks = 1/\{1 - WRs(1-S)\} \quad (5b)$$

In a case where (S, WRs) is in the second area, the expression of Wd>Ddmax is established. The following expression (6a) is derived by substituting Dmin=Dmax(1−S) into the expression (3a) and solving the expression of Wd≤1.

$$Ks \le 1/\{Dmax - WRs(1-S)\} \quad (6a)$$

The coefficient Ks is determined as with the following expression (6b) so as to establish the expression (6a) even when Dmax is 1. The expression (6b) shows the maximum value which may be taken by the coefficient Ks under a condition of Dmax=1, in a case where (S, WRs) is in the second area.

$$Ks = 1/\{WRs(1-S)\} \quad (6b)$$

In a case where the distribution ratio WRs is determined to cause (S, WRs) to be in the first area, the expression of Ddmin<Wd<Ddmax is established, and a difference between image data Wd, Bd, Gd, and Rd of four colors included in the driving image data D2 becomes the minimum (establishing (Ddmax−Ddmin)). In this case, the maximum value which may be taken by the coefficient Ks with the distribution ratio WRs under a condition of Dmax=1 is given by the expression (5b). As (S, WRs) becomes closer to a boundary line between the first and second areas, the white image data Wd approaches the maximum value Ddmax. As (S, WRs) becomes closer to a boundary line between the first and third areas, the white image data Wd approaches the minimum value Ddmin. In a case where the distribution ratio WRs is determined to cause (S, WRs) to be in the second area, the expression of Ddmax<Wd is established. In this case, the maximum value which may be taken by the coefficient Ks with the distribution ratio WRs under a condition of Dmax=1 is given by the expression (6b).

The response rate of the pixel 26 changes depending on the gradation displayed by the pixel 26 (referred to as a display gradation below). In the image display device 1, a case where the response rate of the pixel 26 becomes slower as the display gradation increases, and a case where the response rate of the pixel 26 becomes slower as the display gradation decreases are provided. In the former case, the distribution ratio WRs is determined to cause (S, WRs) to be close to the boundary line between the first and second areas, and the white image data Wd is set to approach the maximum value Ddmax. In the latter case, the distribution ratio WRs is determined to cause (S, WRs) to be close to the boundary line between the first and third areas, and the white image data Wd is set to approach the minimum value Ddmin. As described above, if the white image data Wd is set to approach the maximum value Ddmax or the minimum value Ddmin in accordance with the response characteristics of the pixel 26, the gradation is displayed with the higher response rate. Thus, it is possible to improve color reproduction of the image display device 1 by changing the luminance of the pixel 26 fast in each subframe period.

The distribution ratio-and-coefficient computation unit 13 has a function of obtaining the distribution ratio WRs based on the saturation S and a function of obtaining the coefficient Ks based on the saturation S. The functions vary depending on the parameter WRX stored in the parameter storage unit 11.

An example of the function of obtaining the distribution ratio WRs and the function of obtaining the coefficient Ks will be described below. In the following descriptions, the function of obtaining the coefficient Ks is shown by using the distribution ratio WRs. However, since the distribution ratio WRs is obtained based on the saturation S, the function of obtaining the coefficient Ks is a function based on the saturation S. In first and second examples which will be described below, the parameter WRX takes a value in a range of ½≤WRX≤1.

In the first example, the distribution ratio-and-coefficient computation unit 13 obtains the distribution ratio WRs by the following expression (7) and obtains the coefficient Ks by the expression (5b).

$$WRs = \min(WBRo/(1-S), WRX) \quad (7)$$

Here, in the expression (7), WBRo is ½.

Figure 4A:
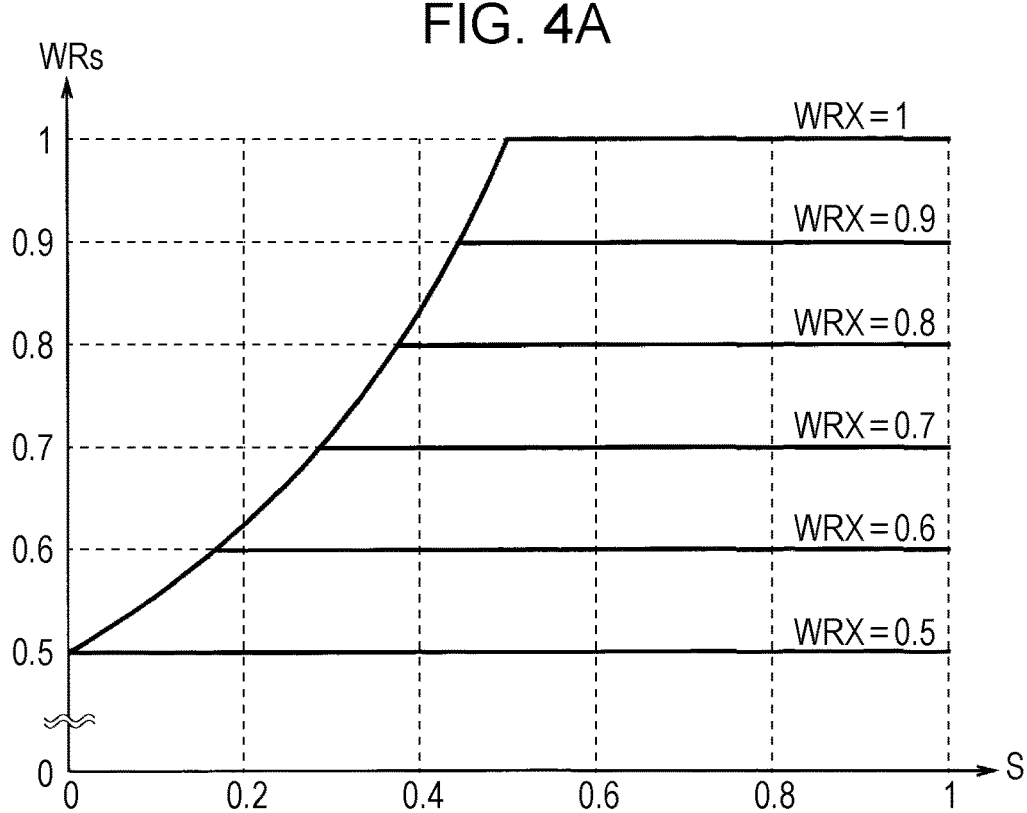
FIG. 4A is a diagram illustrating a graph of the distribution ratio (first example) in the image display device according to the reference example and the first embodiment.
Figure 4B:
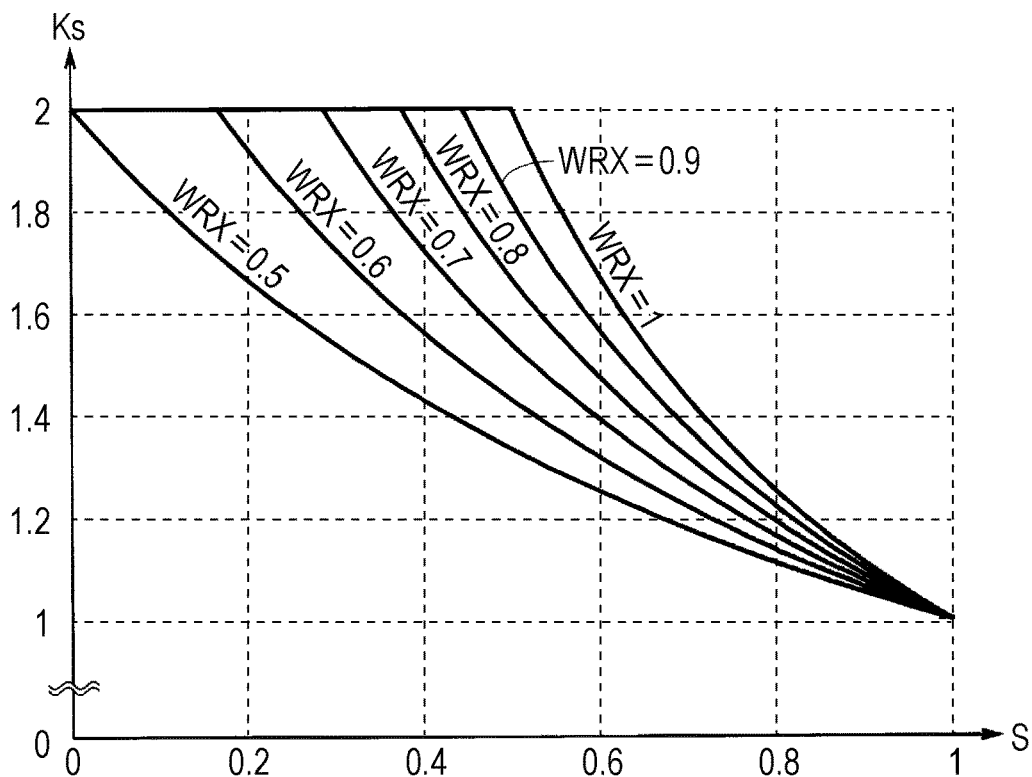
FIG. 4B is a diagram illustrating a graph of a coefficient (first example) in the image display device according to the reference example.

FIG. 4A is a diagram illustrating a graph of the distribution ratio WRs according to the first example. FIG. 4B is a diagram illustrating a graph of the coefficient Ks according to the first example. The graph illustrated in FIG. 4A is normally provided in the first area. Since the maximum value which may be taken by the coefficient Ks is obtained by using the distribution ratio WRs under a condition of Dmax=1, the coefficient Ks is obtained by the expression (5b). Since the distribution ratio WRs and the coefficient Ks are obtained by the above-described method, it is possible to obtain the maximum coefficient Ks to be permitted, while the difference between the image data Wd, Bd, Gd, and Rd of four colors is made to be the minimum.

In a case where the response rate of the pixel 26 becomes slower as the display gradation increases, the parameter WRX is set to have a value close to 1, and the white image data Wd is set to approach the maximum value Ddmax. In a case where the response rate of the pixel 26 becomes slower as the display gradation decreases, the parameter WRX is set to have a value close to 0.5, and the white image data Wd is set to approach the minimum value Ddmin. As described above, if the parameter WRX is set in accordance with the response characteristics of the pixel 26, it is possible to improve color reproduction of the image display device 1 by displaying the gradation with the higher response rate.

In the second example, the distribution ratio-and-coefficient computation unit 13 obtains the distribution ratio WRs by the following expression (8) and obtains the coefficient Ks by the expression (5b).

[Expression 1]

$$WRs = \begin{cases} \dfrac{WBRo}{1-S} & (\text{TIME OF } WRX \geq Ts \text{ AND } 1-S \geq WBRx) \\ WRX - \dfrac{WRX(1-S)^2}{3 \cdot WBRx^2} & (\text{TIME OF } WRX \geq Ts \text{ AND } 1-S < WBRx) \\ (WBRo - WRX)(1-S)^2 + WRX & (\text{TIME OF } WRX < Ts) \end{cases} \quad (8)$$

Here, in the expression (8), WBRo is ½, Ts is ¾, and WBRx is 3/(4WRX).

Figure 5A:
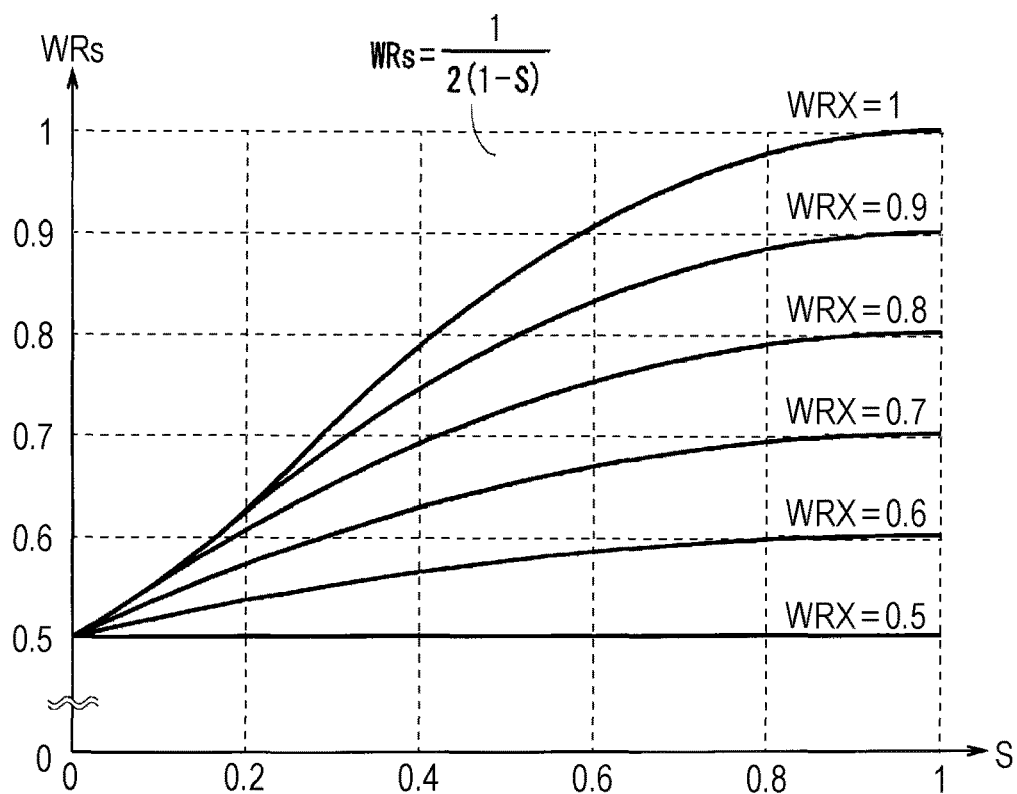
FIG. 5A is a diagram illustrating a graph of the distribution ratio (second example) in the image display device according to the reference example and the first embodiment.
Figure 5B:
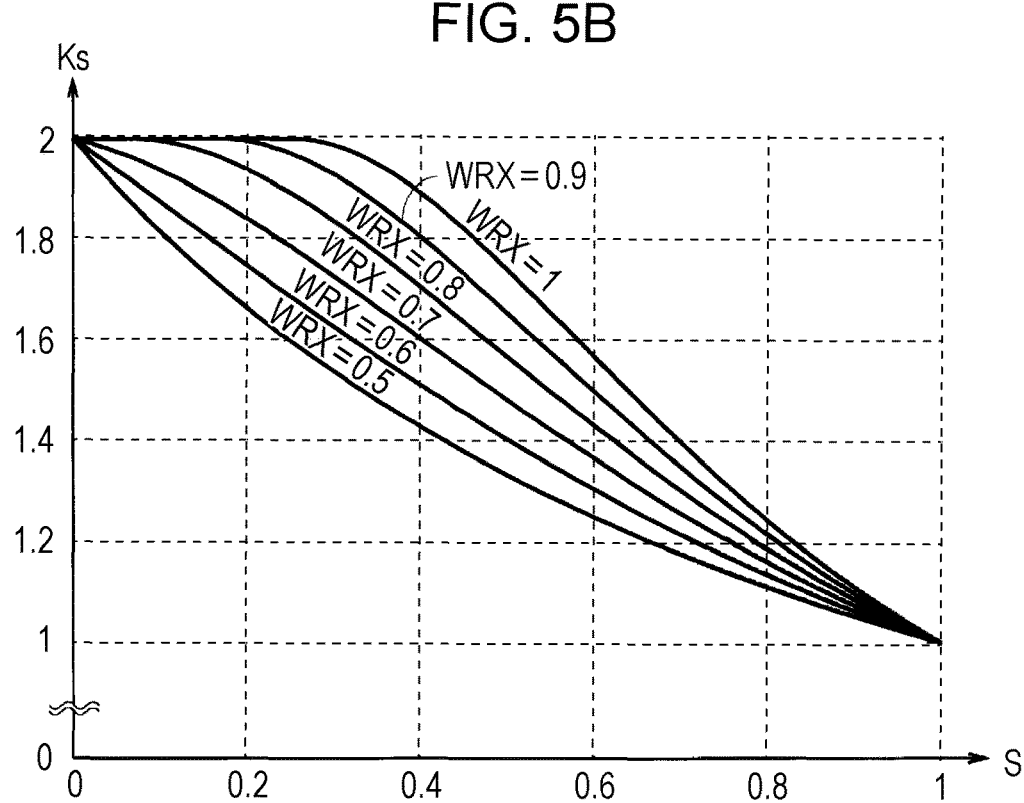
FIG. 5B is a diagram illustrating a graph of the coefficient (second example) in the image display device according to the reference example.

FIG. 5A is a diagram illustrating a graph of the distribution ratio WRs according to the second example. FIG. 5B is a diagram illustrating a graph of the coefficient Ks according to the second example. At time of WRX<Ts (=¾), the function of obtaining the distribution ratio WRs is a quadratic function which takes a value WBRo (=½) when S is 0, and has the maximum value WRX when S is 1. At time of WRX≥Ts, the function of obtaining the distribution ratio WRs is a fractional function of WRs=1/{2(1−S)} in a case of 1−S≥WBRx, and the function is a quadratic function which takes the maximum value WRX at time of S=1 in a case of 1−S<WBRx. The latter function is determined such that the graph of the former function comes into contact with the graph of the latter function at a point (1−WBRx, 2WRX/3). The graph illustrated in FIG. 5A is normally provided in the first area. Since the maximum value which may be taken by the coefficient Ks is obtained by using the distribution ratio WRs under a condition of Dmax=1, the coefficient Ks is obtained by the expression (5b). Since the distribution ratio WRs and the coefficient Ks are obtained by the above-described method, it is possible to obtain the maximum coefficient Ks to be permitted, while the difference between the image data Wd, Bd, Gd, and Rd of four colors is made to be the minimum.

Also in the second example, in a case where the response rate of the pixel 26 becomes slower as the display gradation increases, the parameter WRX is set to have a value close to 1. In a case where the response rate of the pixel 26 becomes slower as the display gradation decreases, the parameter WRX is set to have a value close to 0.5. Thus, similar to the first example, it is possible to improve color reproduction of the image display device 1.

In the first example, when WRX is not 0.5, the function of obtaining the distribution ratio WRs and the function of obtaining the coefficient Ks do not smoothly change in the vicinity of S satisfying 1−WBRo/WRX. In the second example, the functions smoothly change in a range of 0<S<1. Thus, according to the second example, it is possible to prevent distortion of an image when a gradation image is displayed.

First Embodiment

An image display device according to a first embodiment has the same configuration as the image display device 1 according to the reference example (see FIG. 1). However, in the image display device according to the embodiment, the parameter storage unit 11 stores parameters RA and RB in addition to the parameter WRX. The distribution ratio-and-coefficient computation unit 13 obtains the coefficient Ks by a calculation expression different from that in the reference example. Differences from the reference example will be described below.

The distribution ratio-and-coefficient computation unit 13 obtains the distribution ratio WRs by the same calculation expression as that in the reference example, and obtains the coefficient Ks by a calculation expression different from that in the reference example. More specifically, when the maximum value (maximum value of image data Wd, Bd, Gd, and Rd of the four colors) of driving image data D2 in one frame period is set as DDmax, the minimum value (minimum value of the image data Wd, Bd, Gd, and Rd of the four colors) of the driving image data D2 in one frame period is set as DDmin, the distribution ratio-and-coefficient computation unit 13 obtains the coefficient Ks in accordance with the parameters RA and RB stored in the parameter storage unit 11, so as to satisfy the following expression (9).

$$DD\text{max} \leq RA \cdot DD\text{min} + RB \quad (9)$$

Figure 6:
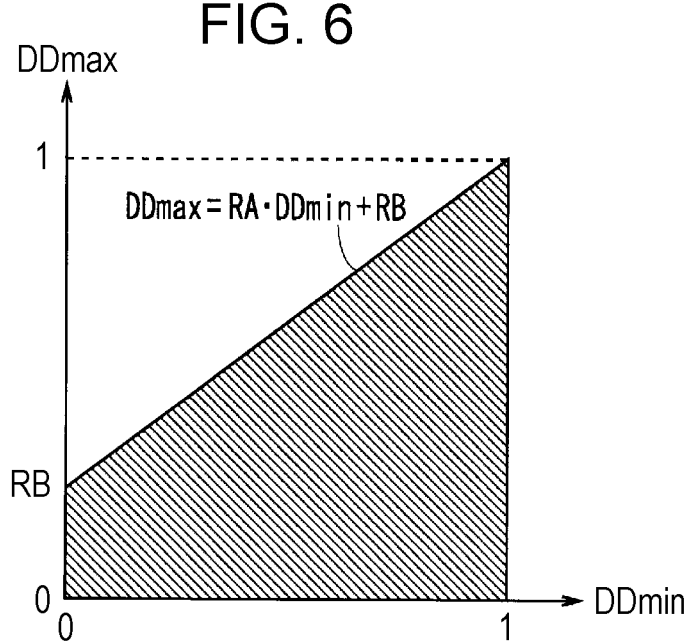
FIG. 6 is a diagram illustrating a parameter in the image display device according to the first embodiment.

For example, in a case of RB=1−RA, the range satisfying the expression (9) corresponds to a shaded area illustrated in FIG. 6. As described above, the parameters RA and RB designate the range of the maximum value DDmax in accordance with the minimum value DDmin. The image display device 1 according to the reference example corresponds to a case where RA=0 and RB=1 are set in the image display device according to the embodiment.

In the embodiment, the range of the saturation S and the distribution ratio WRs is also divided into a first area in which Ddmin<Wd<Ddmax is satisfied, a second area in which Ddmax<Wd is satisfied, and a third area in which Wd<Ddmin is satisfied (see FIG. 3).

In a case where (S, WRs) is in the first area, DDmin is Ddmin, and DDmax is Ddmax. Thus, with the expression of Ddmax≤RA·Ddmin+RB, the maximum value which may be taken by the coefficient Ks with the distribution ratio WRs in this case of Ddmax≤RA·Ddmin+RB under a condition in which Dmax is set to 1 is obtained by the following expression (10a). In a case where (S, WRs) is in the second area, DDmin is Ddmin, and DDmax is Wd. Thus, with the expression of Wd≤RA·Ddmin+RB, the maximum value which may be taken by the coefficient Ks with the distribution ratio WRs in this case of Wd≤RA·Ddmin+RB under a condition in which Dmax is set to 1 is obtained by the following expression (10b). In a case where (S, WRs) is in the third area, DDmin is Wd, and DDmax is Ddmax. Thus, with the expression of Ddmax≤RA·Wd+RB, the maximum value which may be taken by the coefficient Ks with the distribution ratio WRs in this case of Ddmax≤RA·Wd+RB under a condition in which Dmax is set to 1 is obtained by the following expression (10c).

[Expression 2]

$$Ks = \dfrac{RB}{1 - [WRs(1-RA) + RA](1-S)} \quad (10a)$$

$$Ks = \dfrac{RB}{[WRs(1+RA) - RA](1-S)} \quad (10b)$$

$$Ks = \frac{RB}{1 - WRs(1 + RA)(1 - S)} \quad (10c)$$

Similar to the reference example, the image data conversion unit 10 operates in accordance with the flowchart illustrated in FIG. 2. However, in the embodiment, the distribution ratio-and-coefficient computation unit 13 obtains the coefficient Ks based on the saturation S and the parameters WRX, RA, and RB in Step S105.

An example of the function of obtaining the distribution ratio WRs and the function of obtaining the coefficient Ks will be described below. In first and second examples which will be described below, the parameters RA and RB respectively have values in ranges of 0≤RA≤1 and 0≤RB≤1, and the parameter WRX takes a value in a range of ½ WRX≤1.

Figure 7:
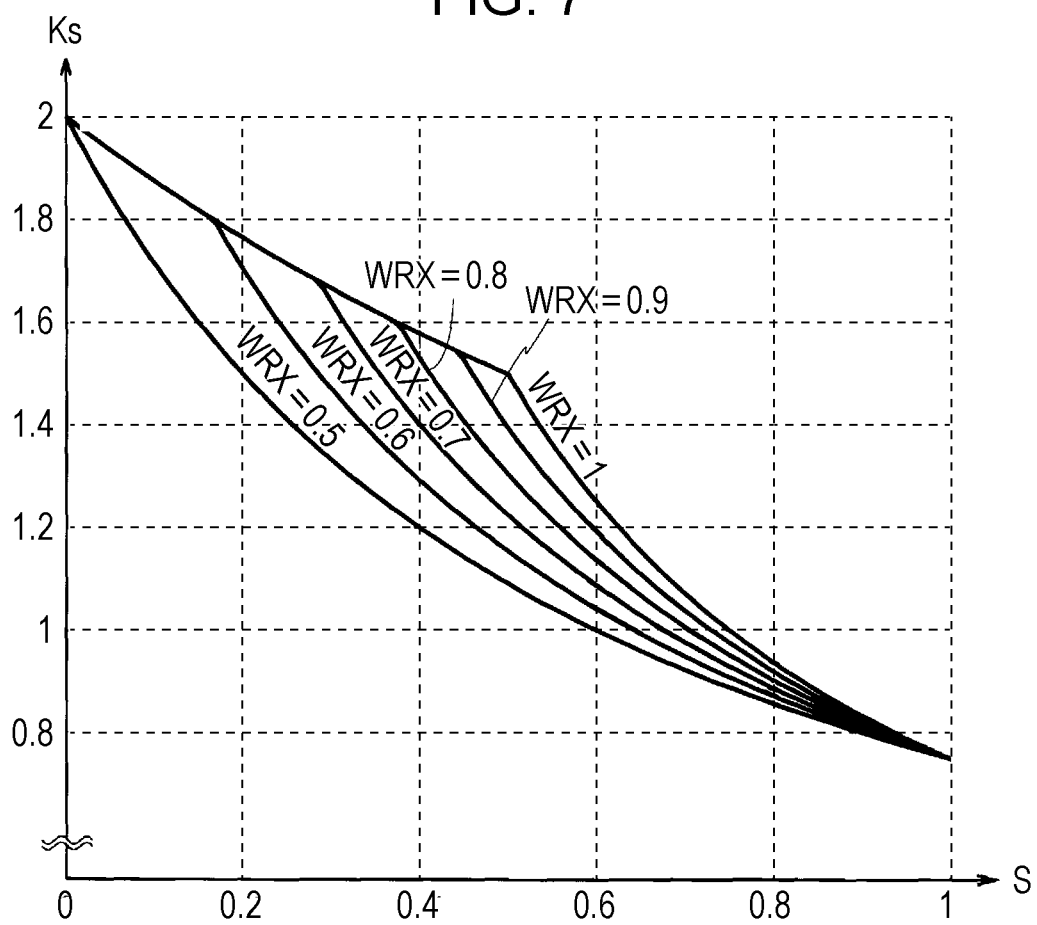
FIG. 7 is a diagram illustrating a graph of the coefficient (first example) in the image display device according to the first embodiment.

In the first example, the distribution ratio-and-coefficient computation unit 13 obtains the distribution ratio WRs by the expression (7) and obtains the coefficient Ks by the expression (10a). Here, in the expression (7), WBRo is ½. A graph of the distribution ratio WRs according to the first example is as illustrated in FIG. 4A. FIG. 7 is a diagram illustrating a graph of the coefficient Ks according to the first example, when RA is set to 0.25, and RB is set to 0.75. According to the first example, similar to the first example in the reference example, it is possible to improve color reproduction of the image display device by setting the parameter WRX in accordance with the response characteristics of the pixel 26.

Figure 8:
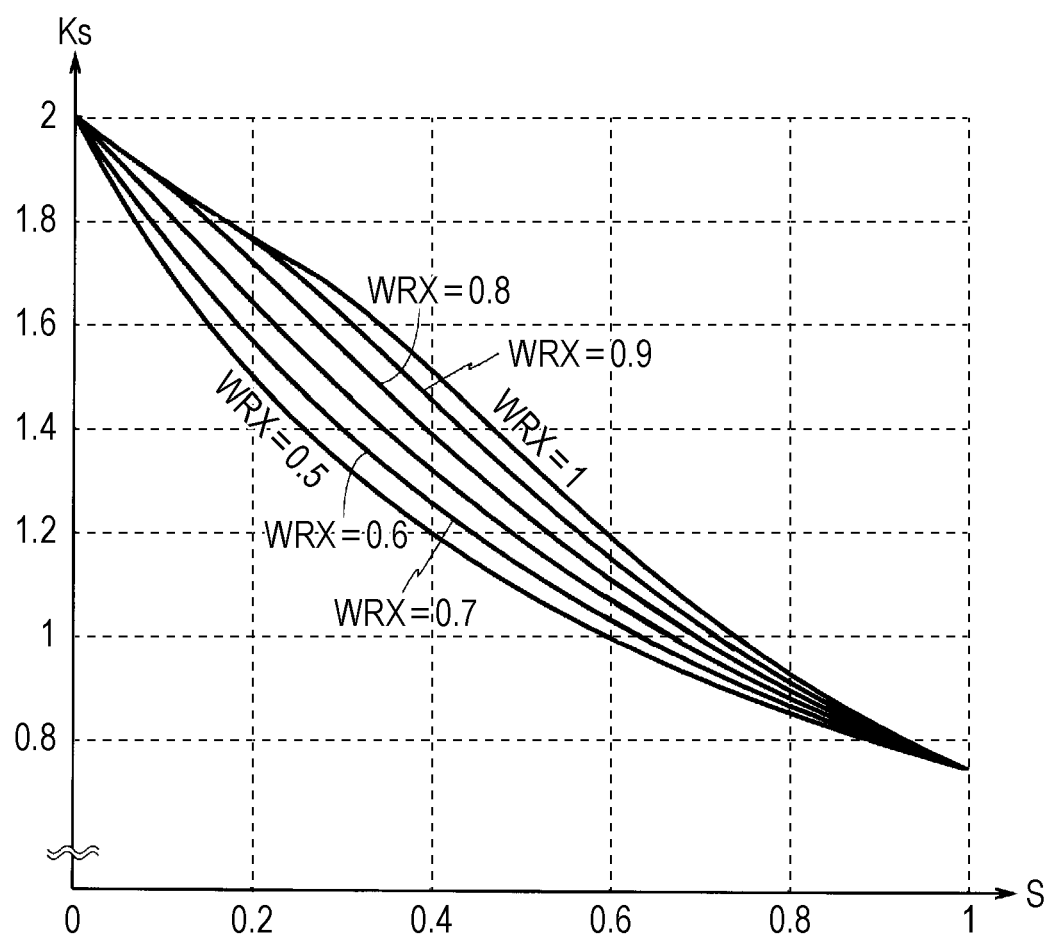
FIG. 8 is a diagram illustrating a graph of the coefficient (second example) in the image display device according to the first embodiment.

In the second example, the distribution ratio-and-coefficient computation unit 13 obtains the distribution ratio WRs by the expression (8) and obtains the coefficient Ks by the expression (10a). Here, in the expression (8), WBRo is ½, Ts is ¾, and WBRx is 3/(4WRX). A graph of the distribution ratio WRs according to the second example is as illustrated in FIG. 5A. FIG. 8 is a diagram illustrating a graph of the coefficient Ks according to the second example, when RA is set to 0.25, and RB is set to 0.75. Details of a function of obtaining the distribution ratio WRs are similar to those in the reference example. According to the second example, similar to the second example in the reference example, it is possible to obtain the maximum coefficient Ks to be permitted, while the difference between the image data Wd, Bd, Gd, and Rd of four colors is made to be the minimum. If the parameter WRX is set in accordance with the response characteristics of the pixel 26, it is possible to improve color reproduction of the image display device and to prevent distortion of an image when a gradation image is displayed.

Features and advantageous effects of image-data conversion processing in the image display device according to the embodiment will be described. As described above, in Step S106, the driving image-data operation unit 14 obtains image data Wd, Bd, Gd, and Rd of the four colors by the expressions (2a) to (2d), based on the image data Ri, Gi, and Bi of the three colors, the minimum value Dmin, the distribution ratio WRs, and the coefficient Ks. Here, a color shown by the image data Ri, Gi, or Bi of the three colors is referred to as a color before conversion, and a color shown by the image data Wd, Bd, Gd, or Rd of the four colors is referred to as colors after conversion. When the two colors are expressed in an HSV color space, brightness V is different between the two colors, the hue H is the same between the two colors, and the saturation S is the same between the two colors. As described above, in image-data conversion processing in the image data conversion unit 10, for each pixel, the hue H holds the same value and the saturation S holds the same value in the HSV color space, between the input image data D1 and the driving image data D2.

In the first and second examples, when S is 0, WRs is 0.5, and Wd=Bd=Gd=Rd is satisfied. As described above, in the image-data conversion processing in the image data conversion unit 10, for each pixel, the components of the driving image data D2 are set to have the same value when the saturation S of the input image data D1 is equal to the minimum saturation (=0). Thus, it is possible to prevent an occurrence of a situation in which image data after conversion changes in one frame period when the saturation S is equal to the minimum saturation.

In the first and second examples, when S is 1, Ks is RB. Thus, in a case where the parameter RB is smaller than 1, the coefficient Ks at time of S=1 is smaller than 1. For example, in the examples illustrated in FIGS. 7 and 8, the coefficient Ks at time of S=1 is 0.75, that is, smaller than 1. As described above, in the image-data conversion processing in the image data conversion unit 10, for each pixel, the components of the input image data D1 are multiplied by the same value (coefficient Ks smaller than 1) and then data obtained by the multiplication is compressed, when the saturation S is equal to the maximum saturation (=1). Thus, it is possible to suitably limit the range of the driving image data D2.

In the first and second examples, the distribution ratio-and-coefficient computation unit 13 obtains the distribution ratio WRs so as to cause (S, WRs) to be in the first area. The first area corresponds to a range satisfying the expression of Ddmin<Wd<Ddmax, that is, a range in which the white image data Wd is in a range from the minimum value Ddmin of blue image data Bd, green image data Gd, and red image data Rd to the maximum value Ddmax thereof. As described above, since the distribution ratio WRs is obtained such that the white image data Wd is in a range from the minimum value Ddmin of blue image data Bd, green image data Gd, and red image data Rd to the maximum value Ddmax thereof, it is possible to suppress a change of image data after conversion, in one frame period, and to improve color reproduction of the image display device.

In the first and second examples, the distribution ratio-and-coefficient computation unit 13 obtains the distribution ratio WRs increasing as the saturation S increases. Thus, it is possible to suppress an occurrence of color breakup by increasing a ratio of a value distributed to a white subframe as the saturation S becomes greater. In the second example, the distribution ratio-and-coefficient computation unit 13 obtains the distribution ratio WRs and the coefficient Ks by the functions which smoothly change depending on the saturation S. Thus, it is possible to prevent distortion of an image when a gradation image is displayed.

The distribution ratio-and-coefficient computation unit 13 obtains the coefficient Ks by the expression (10a) in the first and second examples. Instead, in the first and second examples, the distribution ratio-and-coefficient computation unit 13 may obtain the coefficient Ks by another calculation expression for obtaining a value smaller than that in the expression (10a).

Figure 9A:
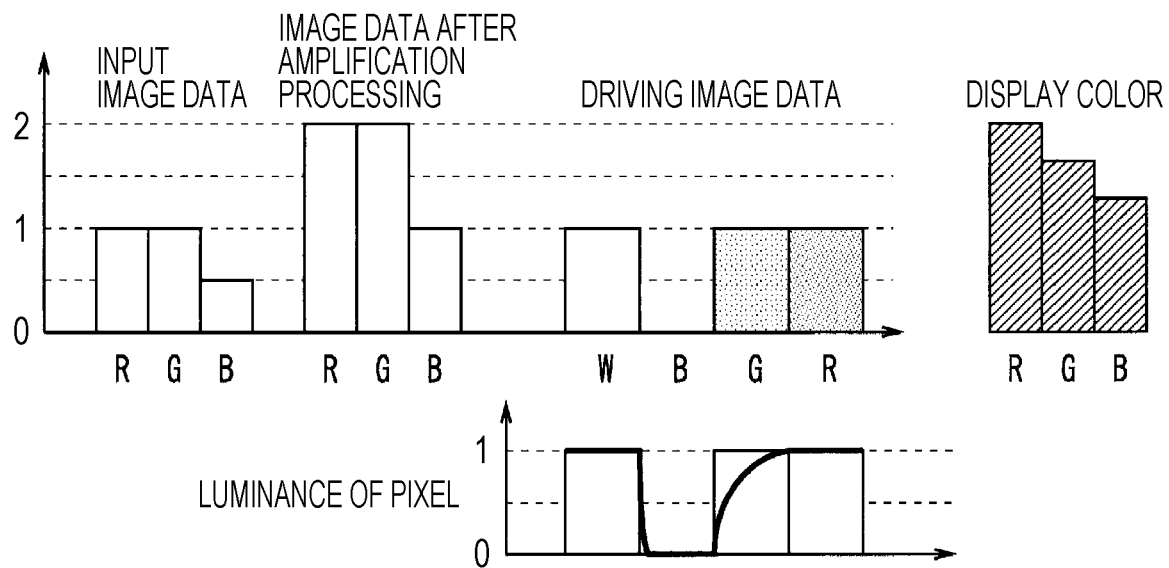
FIG. 9A is a diagram illustrating an example of the image-data conversion processing performed by an image display device in the related art.
Figure 9B:
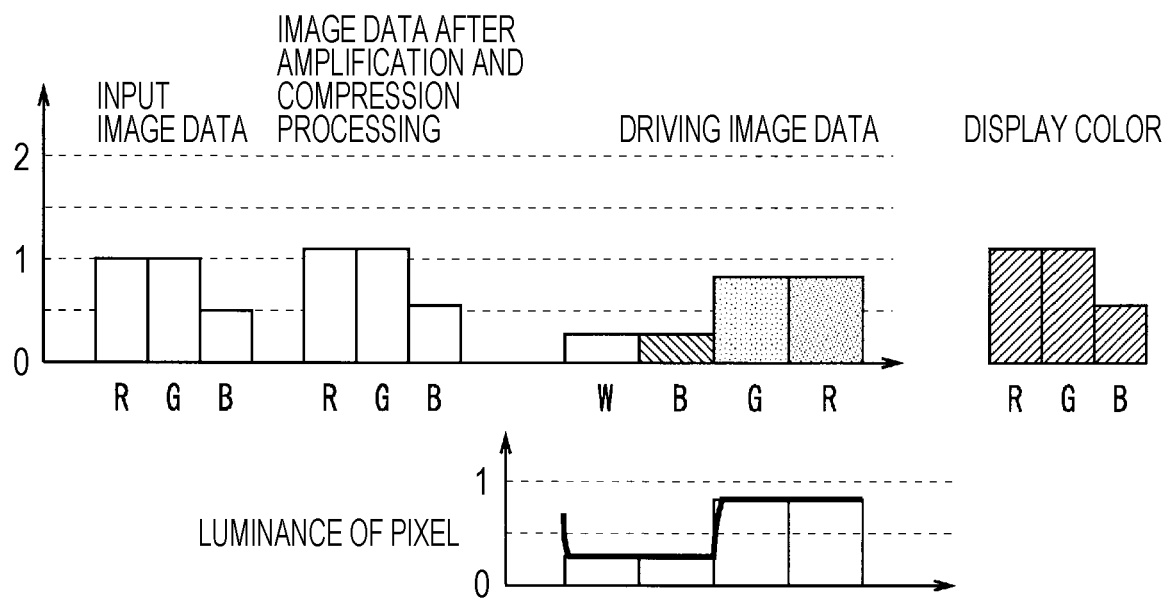
FIG. 9B is a diagram illustrating an example of the image-data conversion processing performed by the image display device according to the reference example.

The advantageous effects of the image display device according to the embodiment will be described with reference to FIGS. 9A and 9B, in comparison to the image display device (referred to an image display device in the related art below) disclosed in PTL 1. FIG. 9A is a diagram illustrating an example of image-data conversion processing performed by the image display device in the related art. FIG. 9B is a diagram illustrating an example of image-data conversion processing performed by the image display device according to the embodiment.

Here, as an example, a case where image data (Ri, Gi, Bi) of the three colors included in input image data D1 corresponds to (1, 1, 0.5) will be considered. In the image display device in the related art (FIG. 9A), amplification and compression processing of performing multiplication by a coefficient of 2 is performed, and thus image data after the amplification and compression processing is (2, 2, 1). The distribution ratio is determined to be 1, and image data (Wd, Bd, Gd, Rd) of the four colors included in driving image data D2 corresponds to (1, 0, 1, 1). In a case where the response rate of a pixel is slow, the luminance of the pixel slowly changes in each subframe period. In this example, since a large difference is provided between the blue image data Bd and the green image data Gd, the luminance of the pixel slowly changes in a green subframe period. As a result, as illustrated at the right end in FIG. 9A, the color displayed the pixel has a green color component smaller than a color (color to be displayed) corresponding to the input image data. As described above, in the image display device in the related art, it is not possible to accurately express a color corresponding to input image data.

Here, in the image display device according to the embodiment, it is assumed that RA=0.25, RB=0.75, and WRX=0.5 are set, and the distribution ratio and the coefficient are obtained by the calculation expressions in the second example. In this case, amplification and compression processing of performing multiplication by a coefficient of 12/11, and thus image data after the amplification and compression processing corresponds to (12/11, 12/11, 6/11). The distribution ratio is determined to be 0.5, and image data (Wd, Bd, Gd, Rd) of the four colors included in driving image data D2 corresponds to (3/11, 3/11, 9/11, 9/11). Since a difference between the blue image data and the green image data is smaller than that in the image display device in the related art, the luminance of a pixel changes faster in a green subframe period. As a result, as illustrated at the right end in FIG. 9B, the color displayed the pixel is closer to the color corresponding to the input image data D1. As described above, according to the image display device according to the embodiment, it is possible to express the color corresponding to input image data D1 with accuracy more than that in the image display device in the related art.

As described above, the image display device according to the embodiment is a field sequential type image display device which includes the image data conversion unit 10 that obtains driving image data D2 corresponding to a plurality of subframes including a common color subframe (white subframe), based on input image data D1 corresponding to a plurality of color components (red, green, and blue), and the display unit 20 that displays the plurality of subframes (white, blue, green, and red subframes) based on the driving image data D2, in one frame period. The image data conversion unit 10 performs conversion processing (image-data conversion processing) of converting first image data (input image data D1) corresponding to a plurality of color components into second image data (driving image data D2) corresponding to a plurality of subframes, for each pixel 26. In the conversion processing, for each pixel 26, the hue H and the saturation S of the first image data and the hue H and the saturation S of the second image data in the HSV color space are held to be respectively equal to each other. When the saturation S of the first image data is equal to the minimum saturation (when S is 0), color components of the second image data are set to have the same value. When the saturation S is equal to the maximum saturation (when S is 1), the color components of the first image data are multiplied by the same value (coefficient Ks smaller than 1), and then the first image data is compressed. As described above, while the hue and the saturation are held to have the same value between image data before conversion and image data after conversion, the components of the image data after the conversion is set to have the same value when the saturation is the minimum, and, when the saturation is the maximum, the components of the image data before the conversion are multiplied by the same value and then the data is compressed. In this manner, it is possible to suitably limit the range of the image data after the conversion and to improve color reproduction.

The image data conversion unit 10 obtains the distribution ratio WRs indicating a value to be distributed to the common color subframe and the coefficient Ks used in amplification and compression processing, and performs conversion processing using the distribution ratio WRs and the coefficient Ks. The image data conversion unit 10 obtains the distribution ratio WRs based on the saturation S for each pixel, such that the second image data corresponding to the common color subframe is in a range from the minimum value of the second image data corresponding to other subframes to the maximum value thereof. Thus, it is possible to suppress a change of the image data after the conversion, in one frame period, and to improve color reproduction of the image display device. In the second example, the image data conversion unit 10 obtains the distribution ratio WRs and the coefficient Ks by the functions which smoothly changes depending on the saturation S. Thus, it is possible to prevent distortion of an image when a gradation image is displayed.

In the conversion processing in the image data conversion unit 10, the range of the maximum value of the second image data in one frame period is determined in accordance with the minimum value of the second image data in one frame period. Thus, it is possible to suppress a change of the image data after the conversion, in one frame period, and to improve color reproduction of the image display device. The image data conversion unit 10 obtains the distribution ratio WRs increasing as the saturation S becomes greater, for each pixel. Thus, it is possible to suppress an occurrence of color breakup by increasing a ratio of a value distributed to a common color subframe as the saturation S becomes greater.

The image data conversion unit 10 includes the parameter storage unit 11 that stores a parameter used in the conversion processing. The parameter storage unit 11 stores the first parameter (parameter WRX) in accordance with the response characteristics of a pixel 26 provided in the display unit 20. Thus, it is possible to improve color reproduction by setting a suitable first parameter in accordance with the response characteristics of the display unit 20.

The parameter storage unit 11 stores the second parameters (parameters RA and RB) in addition to the first parameter (parameter WRX). The second parameters are provided for designating the range of the maximum value DDmax of the second image data in one frame period in accordance with the minimum value DDmin of the second image data in one frame period. Since the suitable first parameter is set in accordance with the response characteristics of the display unit 20 and the maximum value DDmax of the driving image data D2 in one frame period is limited in accordance with the minimum value DDmin of the driving image data D2 in one frame period by using the second parameter, it is possible to improve color reproduction.

The image data conversion unit 10 performs the conversion processing on normalized luminance data (input image data D1). Thus, it is possible to accurately perform the conversion processing. The input image data D1 corresponds to the red, green, and blue colors. The driving image data D2 corresponds to red, green, blue, and white subframes. The common color subframe is a white subframe. Thus, in the image display device that displays subframes of three primary colors and the white color based on input image data D1 corresponding to the three primary colors, it is possible to improve color reproduction.

Second Embodiment

Figure 10:
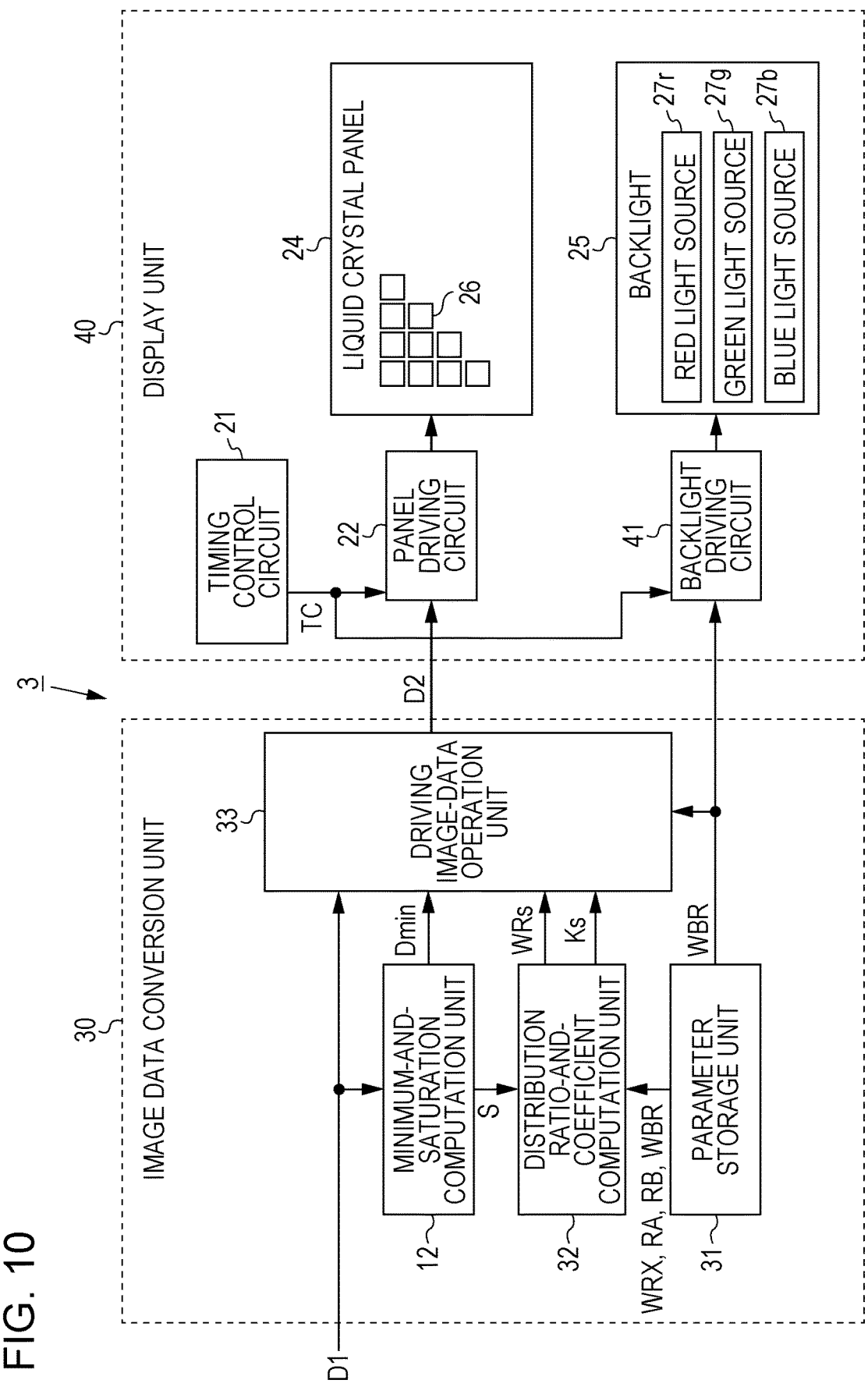
FIG. 10 is a block diagram illustrating a configuration of an image display device according to a second embodiment.

FIG. 10 is a block diagram illustrating a configuration of an image display device according to a second embodiment, An image display device 3 illustrated in FIG. 10 includes an image data conversion unit 30 and a display unit 40, The image data conversion unit 30 includes a parameter storage unit 31, a minimum value-and-saturation computation unit 12, a distribution ratio-and-coefficient computation unit 32, and a driving image-data operation unit 33. The display unit 40 is obtained by replacing the backlight driving circuit 23 in the display unit 20 according to the reference example, with a backlight driving circuit 41.

The parameter storage unit 31 stores a parameter WBR in addition to the parameters WRX, RA, and RB. The distribution ratio-and-coefficient computation unit 32 obtains the distribution ratio WRs and the coefficient Ks by calculation expressions different from those in the reference example and the first embodiment. The driving image-data operation unit 33 obtains driving image data D2 by a calculation expression different from those in the reference example and the first embodiment. Differences from the first embodiment will be described below.

The parameter WBR designates the luminance of the light source 27 which is used when a white subframe is displayed and is provided in the backlight 25. The parameter WBR takes a value in a range of 05 WBR 51. The display unit 40 controls the luminance of the light source 27 in accordance with the parameter WBR, when displaying a white subframe. More specifically, the backlight driving circuit 41 in the display unit 40 controls the luminance of the light source 27 of when a white subframe is displayed, to be WBR times the luminance of the light source 27 of when other subframes are displayed, in accordance with the parameter WBR.

The image display device 1 according to the reference example corresponds to a case where RA=0 and RB=WBR=1 are set in the image display device 3. The image display device according to the first embodiment corresponds to a case where WBR=1 is set in the image display device 3.

The distribution ratio-and-coefficient computation unit 32 obtains the distribution ratio WRs and the coefficient Ks in accordance with the parameters RA and RB stored in the parameter storage unit 31, so as to satisfy the expression (9). The driving image-data operation unit 33 obtains blue image data Bd, green image data Gd, and red image data Rd by the expressions (2b) to (2d) and obtains white image data Wd by the following expression (11), based on the image data Ri, Gi, and Bi of the three colors, the minimum value Dmin, the distribution ratio WRs, the coefficient Ks, and the parameter WBR.

$$Wd = WRs \cdot Dmin \cdot Ks \cdot PP/WBR \quad (11)$$

When PP is 1, Wd is given by the following expression (12).

$$Wd = WRs \cdot Dmin \cdot Ks/WBR \quad (12)$$

The following expression (13a) is derived by solving the expression of Wd>Ddmax in consideration of Dmax=Dmin/(1−S). The following expression (13b) is derived by solving the expression of Wd<Ddmin.

$$WRs > WBRo/(1-S) \quad (13a)$$

$$WRs < WBRo \quad (13b)$$

Here, in the expressions (13a) and (13b), WBRo satisfies WBR/(1+WBR).

Figure 11:
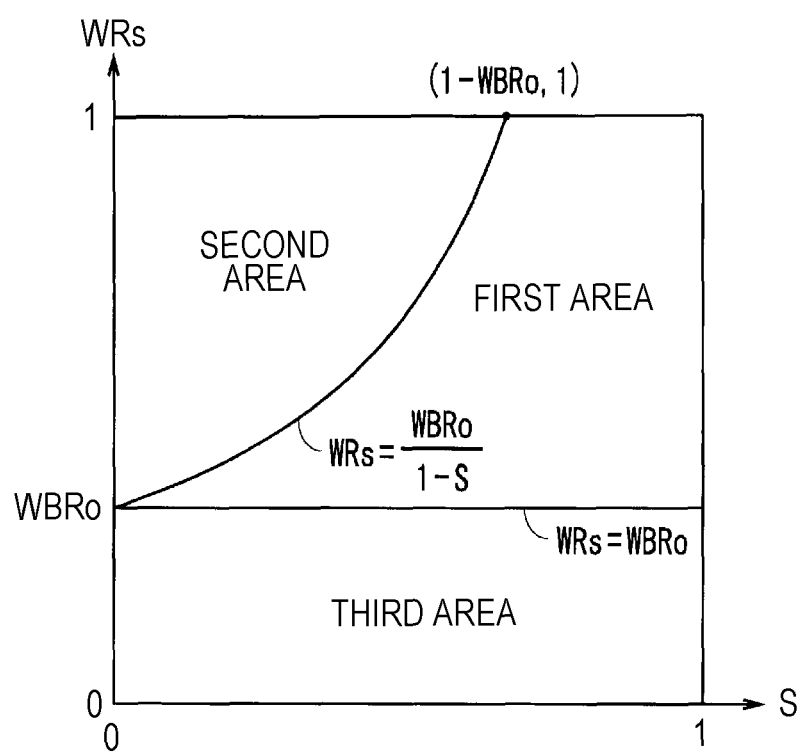
FIG. 11 is a diagram illustrating a range of a saturation and a distribution ratio in the image display device according to the second embodiment.

FIG. 11 is a diagram illustrating a range of the saturation S and the distribution ratio WRs. The range of (S, WRs) illustrated in FIG. 11 is divided into a first area in which Ddmin<Wd<Ddmax is satisfied, a second area in which Ddmax<Wd is satisfied, and a third area in which Wd<Ddmin is satisfied.

In a case where (S, WRs) is in the first area, DDmin is Ddmin, and DDmax is Ddmax. Thus, with the expression of Ddmax≤RA·Ddmin+RB, the maximum value which may be taken by the coefficient Ks with the distribution ratio WRs in this case of Ddmax≤RA·Ddmin+RB when Dmax is set to 1 is obtained by the following expression (10a). In a case where (S, WRs) is in the second area, DDmin is Ddmin, and DDmax is Wd. Thus, with the expression of Wd≤RA·Ddmin+RB, the maximum value which may be taken by the coefficient Ks with the distribution ratio WRs in this case of Wd≤RA·Ddmin+RB when Dmax is set to 1 is obtained by the following expression (14b). In a case where (S, WRs) is in the third area, DDmin is Wd, and DDmax is Ddmax. Thus, with the expression of Ddmax≤RA·Wd+RB, the maximum value which may be taken by the coefficient Ks with the distribution ratio WRs in this case of Ddmax≤RA·Wd+RB when Dmax is set to 1 is obtained by the following expression (14c).

[Expression 3]

$$Ks = \frac{WBR \cdot RB}{(WRs(1 + WBR \cdot RA) - WBR \cdot RA](1-S)} \quad (14b)$$

$$Ks = \frac{WBR \cdot RB}{WBR - WRs(WBR + RA)(1-S)} \quad (14c)$$

Similar to the reference example and the first embodiment, the image data conversion unit 30 operates in accordance with the flowchart illustrated in FIG. 2. However, in the embodiment, the distribution ratio-and-coefficient computation unit 32 obtains the distribution ratio WRs based on the saturation S and the parameters WRX and WBR in Step S104, and obtains the coefficient Ks based on the saturation S and the parameters WRX, RA, RB, and WBR in Step S105. The driving image-data operation unit 33 obtains white image data Wd by the expression (11) in Step S106.

An example of the function of obtaining the distribution ratio WRs and the function of obtaining the coefficient Ks will be described below. In first and second examples which will be described below, the parameters RA, RB, and WBR take values in ranges of 0≤RA≤1, 0≤RB≤1, and 0≤WBR≤1, respectively. The parameter WRX has a value in a range of WBRo≤WRX≤1.

Figure 12A:
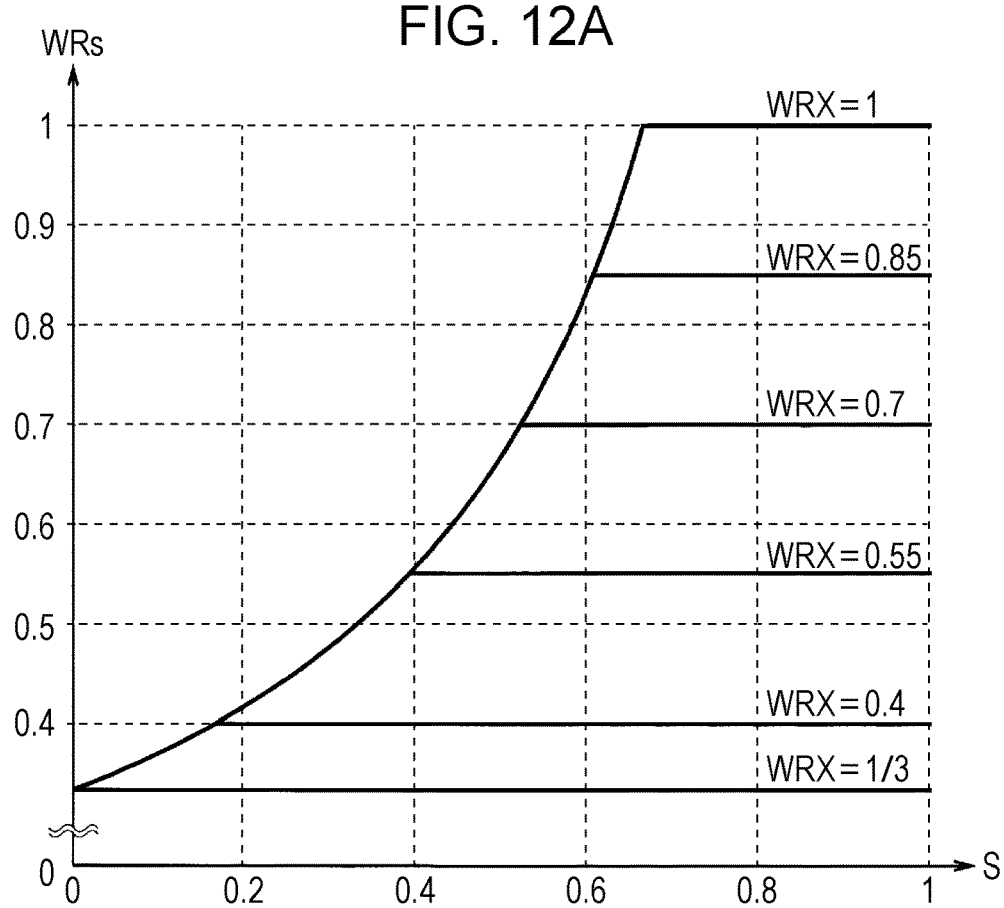
FIG. 12A is a diagram illustrating a graph of the distribution ratio (first example) in the image display device according to the second embodiment.
Figure 12B:
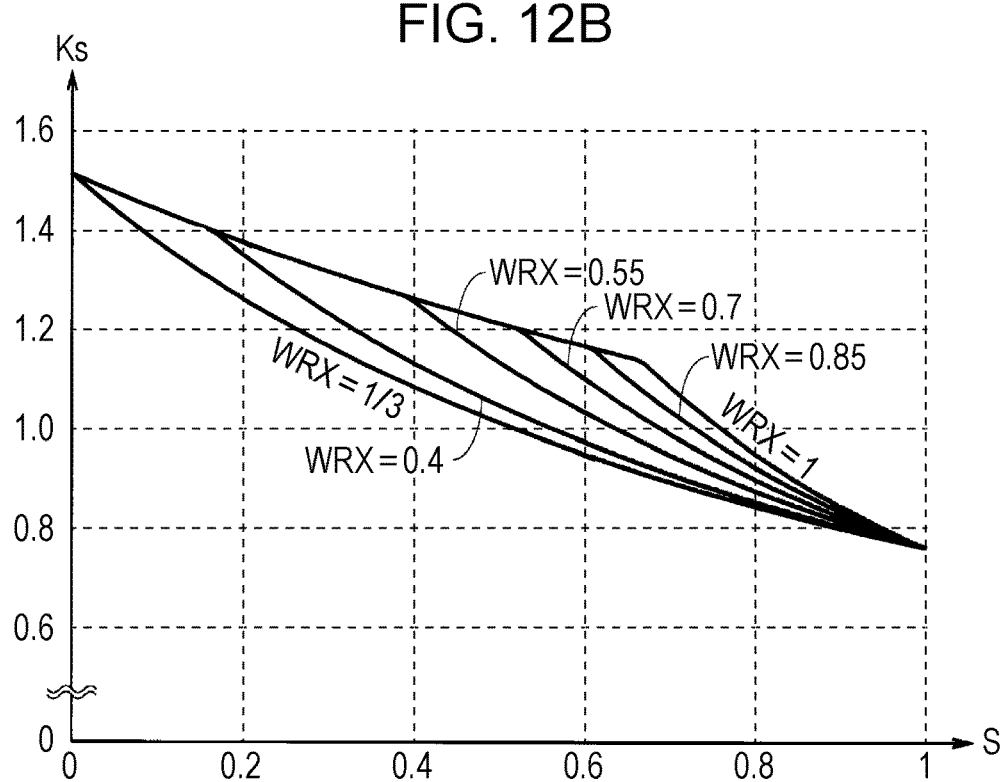
FIG. 12B is a diagram illustrating a graph of a coefficient (first example) in the image display device according to the second embodiment.

In the first example, the distribution ratio-and-coefficient computation unit 32 obtains the distribution ratio WRs by the expression (7) and obtains the coefficient Ks by the expression (10a). Here, in the expression (7), WBRo satisfies WBR/(1+WBR). FIG. 12A is a diagram illustrating a graph of the distribution ratio WRs according to the first example. FIG. 12B is a diagram illustrating a graph of the coefficient Ks according to the first example. In the graphs illustrated in FIGS. 12A and 12B, RA=0.25, RB=0.75, and WBR=0.5 are set. According to the first example, similar to the first examples in the reference example and the first embodiment, it is possible to improve color reproduction of the image display device by setting the parameter WRX in accordance with the response characteristics of the pixel 26. Since the luminance of the light source 27 of when a white subframe is displayed is controlled to be WBR times, it is possible to reduce heat generated by the light source 27.

Figure 13A:
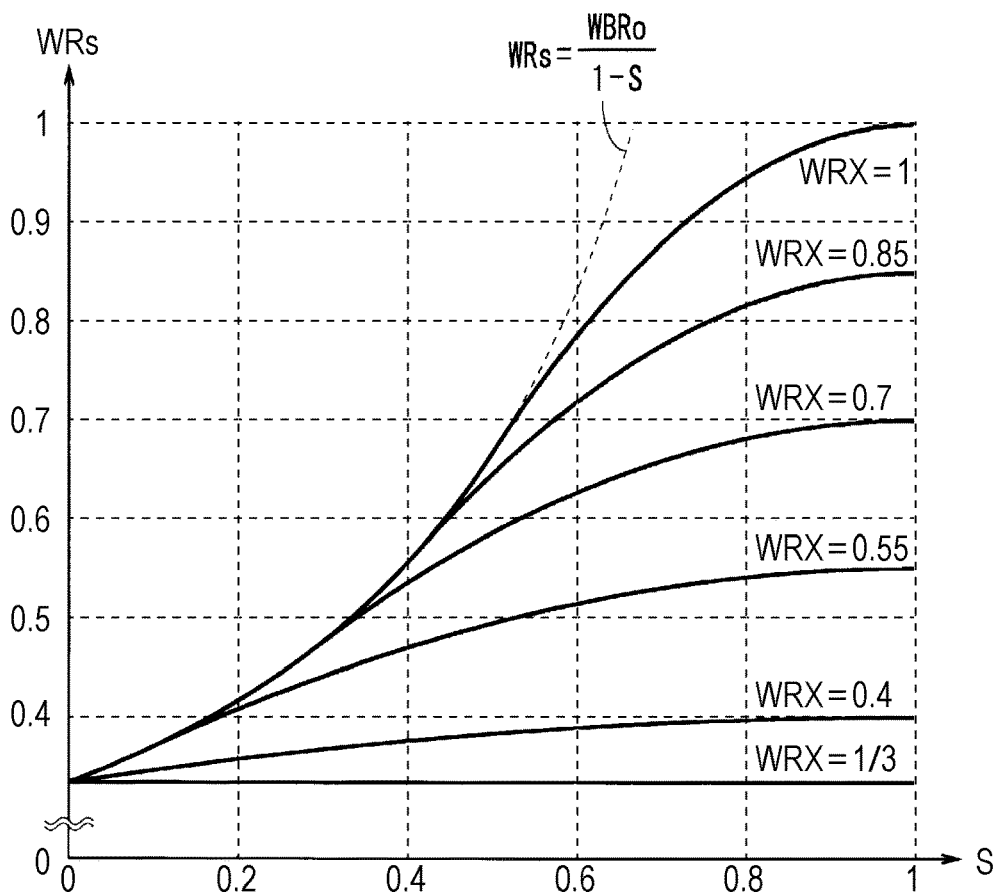
FIG. 13A is a diagram illustrating a graph of the distribution ratio (second example) in the image display device according to the second embodiment.
Figure 13B:
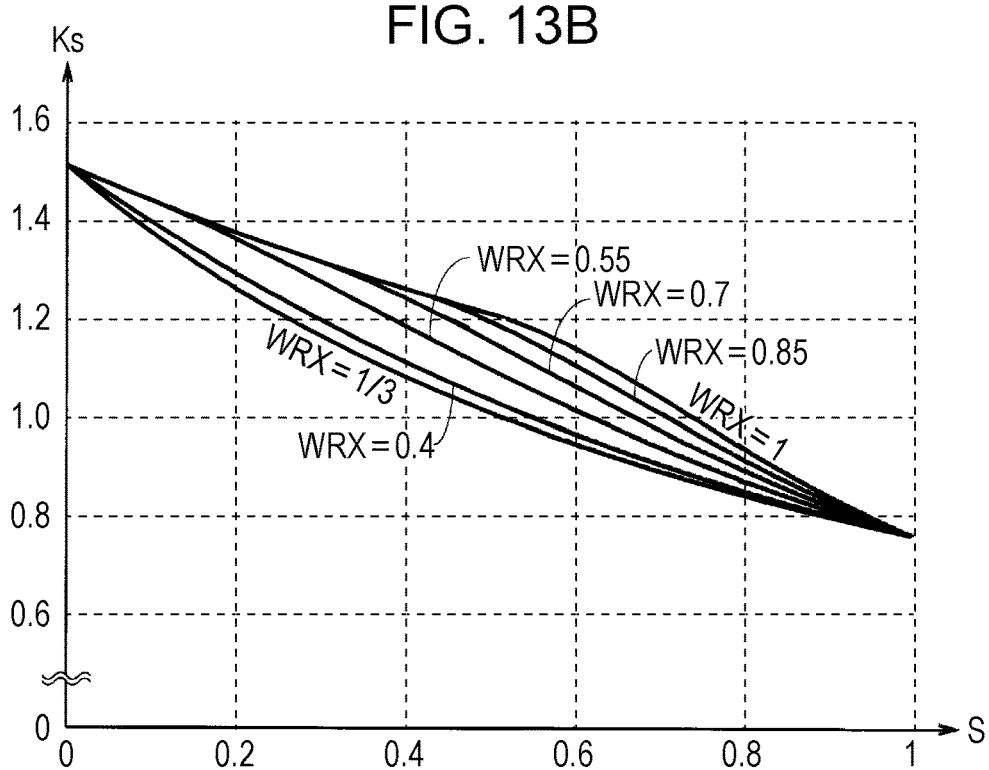
FIG. 13B is a diagram illustrating a graph of the coefficient (second example) in the image display device according to the second embodiment.

In the second example, the distribution ratio-and-coefficient computation unit 32 obtains the distribution ratio WRs by the expression (8) and obtains the coefficient Ks by the expression (10a). Here, in the expression (8), the expressions of WBRo=WBR/(1+WBR), Ts=3WBRo/2, and WBRx=3WBR/{2WRX(1+WBR)} are satisfied. FIG. 13A is a diagram illustrating a graph of the distribution ratio WRs according to the second example. FIG. 13B is a diagram illustrating a graph of the coefficient Ks according to the second example. In the graphs illustrated in FIGS. 13A and 13B, RA=0.25, RB=0.75, and WBR=0.5 are set. Details of a function of obtaining the distribution ratio WRs are similar to those in the reference example. According to the second example, similar to the second examples in the reference example and the first embodiment, it is possible to obtain the maximum coefficient Ks to be permitted, while the difference between the image data Wd, Bd, Gd, and Rd of four colors is made to be the minimum. If the parameter WRX is set in accordance with the response characteristics of the pixel 26, it is possible to improve color reproduction of the image display device and to prevent distortion of an image when a gradation image is displayed. Since the luminance of the light source 27 of when a white subframe is displayed is controlled to be WBR times, it is possible to reduce heat generated by the light source 27.

Similar to the first embodiment, in the image display device 3 according to the embodiment, in image-data conversion processing in the image data conversion unit 30, for each pixel, the hue H also holds the same value and the saturation S also holds the same value in the HSV color space, between input image data D1 and driving image data D2.

In the first and second examples, when S is 0, WRs satisfies WBR/(1+WBR), and Wd=Bd=Gd=Rd is satisfied. As described above, in the image-data conversion processing in the image data conversion unit 30, for each pixel, the components of the driving image data D2 are set to have the same value when the saturation S of the input image data D1 is equal to the minimum saturation (=0).

In the first and second examples, when S is 1, Ks is RB. Thus, in a case where the parameter RB is smaller than 1, the coefficient Ks at time of S=1 is smaller than 1. For example, in the examples illustrated in FIGS. 12B and 13B, the coefficient Ks at time of S=1 is 0.75, that is, smaller than 1. As described above, in the image-data conversion processing in the image data conversion unit 30, for each pixel, the components of the input image data D1 are multiplied by the same value (coefficient Ks smaller than 1) and then data obtained by the multiplication is compressed, when the saturation S is equal to the maximum saturation (=1).

As described above, in the image display device 3 according to the embodiment, the display unit 40 includes the light source 27 and controls the luminance of the light source 27 when displaying a common color subframe (white subframe). Thus, according to the image display device 3, it is possible to reduce heat generated by the light source 27.

The parameter storage unit 31 stores the third parameter (parameter WBR) in addition to the first parameter (parameter WRX) and the second parameter (parameters RA and RB). The third parameter is provided for designating the luminance of the light source 27 provided in the display unit 40 when a common color subframe (white subframe) is displayed. The display unit 40 controls the luminance of the light source 27 in accordance with the third parameter, when displaying the common color subframe. Thus, according to the image display device 3, the suitable first parameter is set in accordance with response characteristics of the display unit 40, and the maximum value DDmax of driving image data D2 in one frame period is controlled by using the second parameter, in accordance with the minimum value DDmin of the driving image data D2 in one frame period. Accordingly, it is possible to more improve color reproduction. In addition, it is possible to reduce heat generated by the light source 27, by controlling the luminance of the light source 27 of when the common color subframe is displayed, with using the third parameter.

Third Embodiment

An image display device according to a third embodiment has the same configuration as the image display device 3 according to the second embodiment (see FIG. 10). The image display device according to the embodiment selectively performs high-luminance-portion noise handling processing. In the image display device according to the embodiment, the parameter storage unit 31 stores parameters GL and RC in addition to the parameters WRX, RA, RB, and WBR. When performing high-luminance-portion noise handling processing, the distribution ratio-and-coefficient computation unit 32 obtains the coefficient Ks by a calculation expression different from that in the second embodiment. Differences from the second embodiment will be described below.

The parameter GL indicates the type of high-luminance-portion noise handling processing and takes a value of 0, 1, or 2. The value of 0 indicates that high-luminance-portion noise handling processing is not performed. The value of 1 or 2 indicates that the high-luminance-portion noise handling processing is performed. The parameter RC is included in the calculation expression of obtaining the coefficient Ks, when the high-luminance-portion noise handling processing is performed. The parameter RC takes a value in a range of 0≤RC<1.

Figure 14:
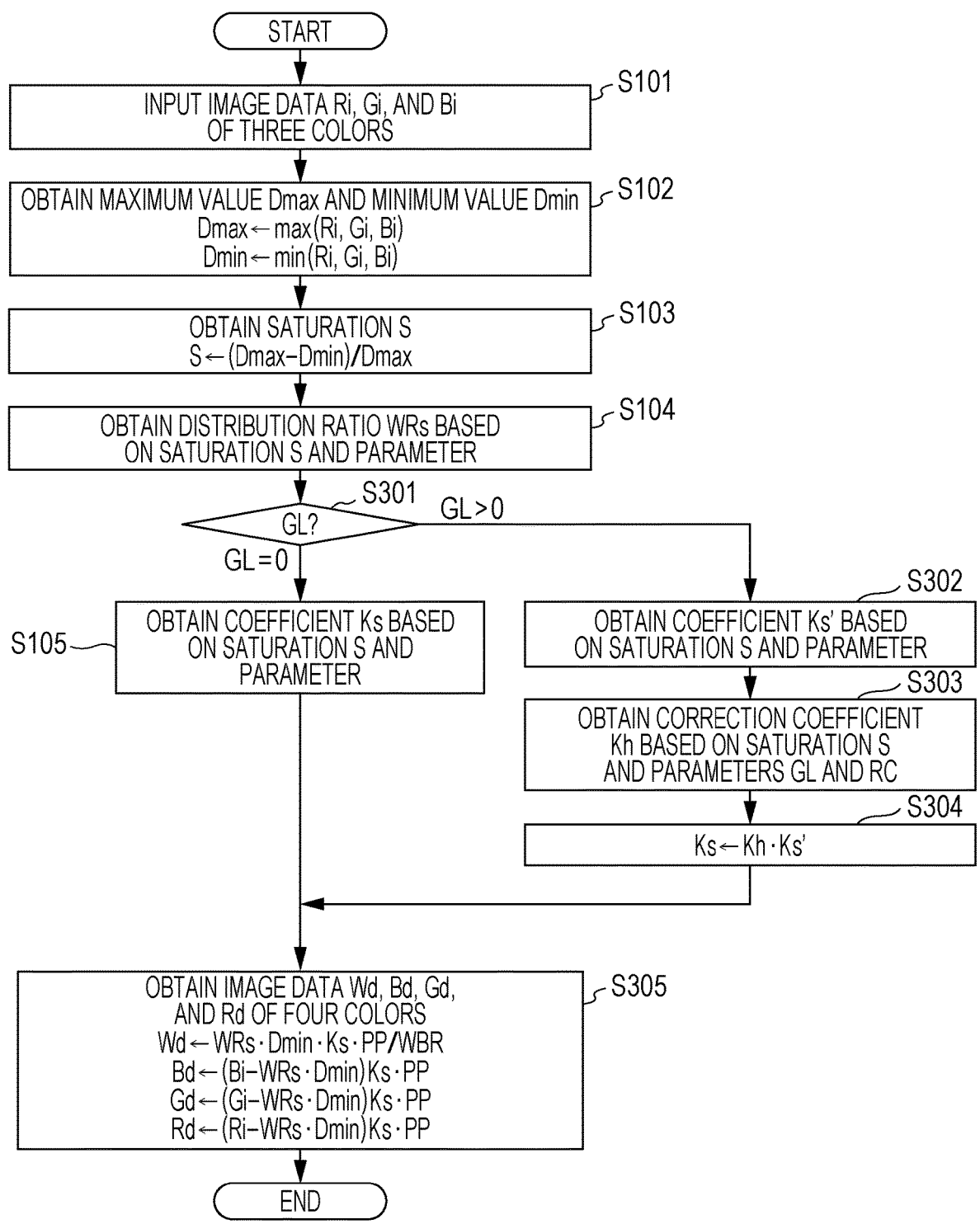
FIG. 14 is a flowchart illustrating image-data conversion processing of an image display device according to a third embodiment.

FIG. 14 is a flowchart illustrating image-data conversion processing according to the embodiment. The flowchart illustrated in FIG. 14 is obtained by adding Step S301 to S304 to the flowchart illustrated in FIG. 2 and replacing Step S106 with Step S305. In Step S101 to S104, the image data conversion unit 30 operates in a manner similar to the second embodiment.

Then, the distribution ratio-and-coefficient computation unit 32 performs condition branching in accordance with the parameter GL (Step S301). The distribution ratio-and-coefficient computation unit 32 causes the process to proceed to Step S105 at time of GL=0, and to proceed to Step S302 at time of GL>0. In the former case, the distribution ratio-and-coefficient computation unit 32 obtains the coefficient Ks by the expression (10a) (Step S105).

In the latter case, the distribution ratio-and-coefficient computation unit 32 obtains a coefficient Ks' by the following expression (15a). Then, the distribution ratio-and-coefficient computation unit 32 obtains a correction coefficient Kh by the following expression (15b) at time of GL=1, and obtains the correction coefficient Kh by the following expression (15c) at time of GL=2 (Step S303). The correction coefficient Kh increases as the saturation S becomes smaller. Then, the distribution ratio-and-coefficient computation unit 32 outputs a result obtained by multiplying the coefficient Ks' by the correction coefficient Kh, as the coefficient Ks (Step S304).

$$Ks'=1/\{1-WRs(1-S)\} \quad (15a)$$

$$Kh=1-RC\cdot S \quad (15b)$$

$$Kh=1-RC\cdot S^2 \quad (15c)$$

Then, the driving image-data operation unit 33 obtains blue image data Bd, green image data Gd, and red image data Rd by the expressions (2b) to (2d) and obtains white image data Wd by the expression (11), based on the image data Ri, Gi, and Bi of the three colors, the minimum value Dmin, the distribution ratio WRs, the coefficient Ks, and the parameter WBR (Step S305).

Figure 15:
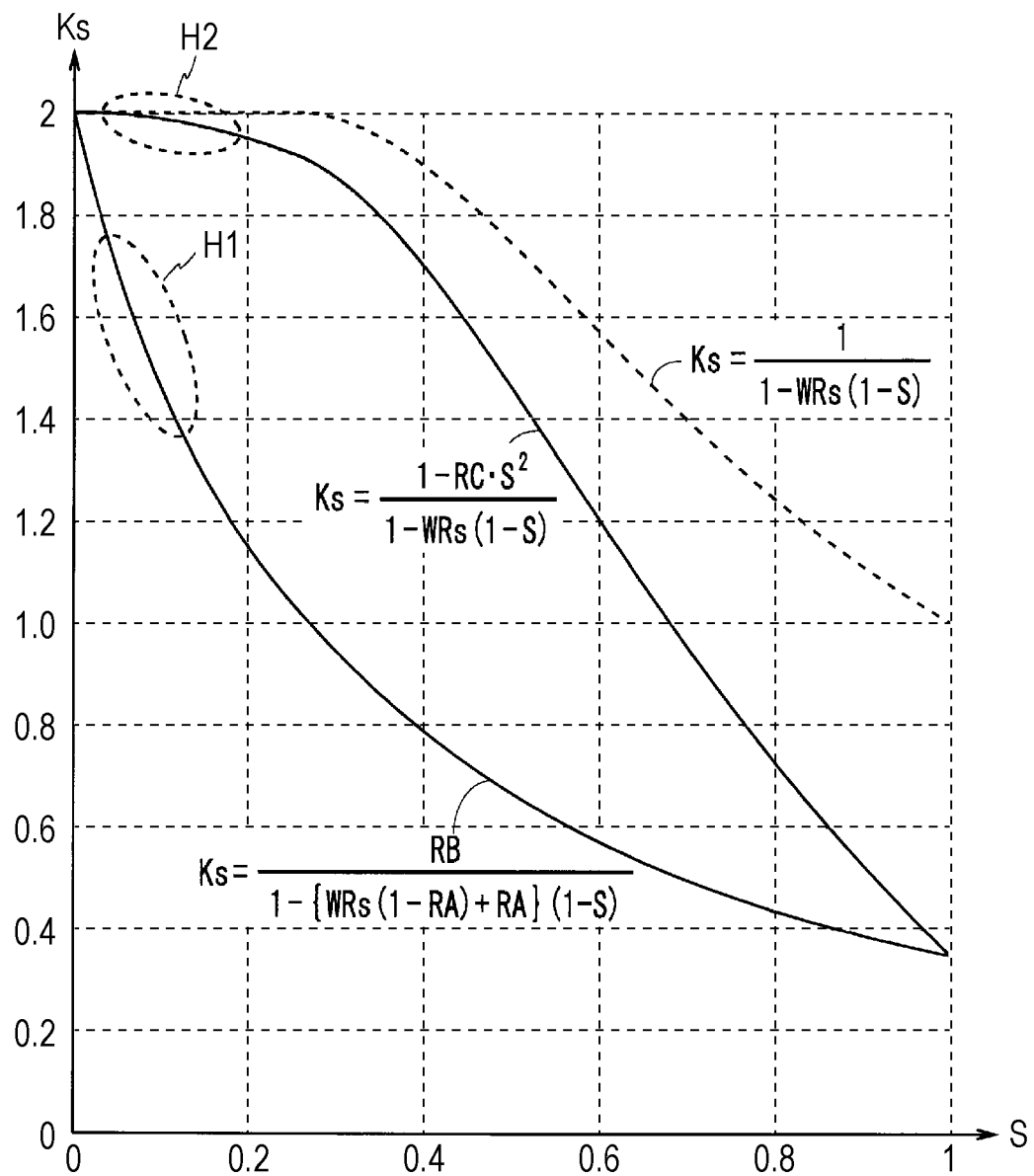
FIG. 15 is a diagram illustrating a graph of a coefficient in the image display device according to the third embodiment.

FIG. 15 is a diagram illustrating a graph of the coefficient Ks. Here, WRX=1, RA=RC=0.65, RB=0.35, and WBR=0.5 are set. FIG. 15 illustrates a graph of a function Ks=RB/[1−{WRs(1−RA)+RA}(1−S)] and a graph of a function Ks=(1−RC·S²)/{1−WRs(1−S)} (the former function is referred to as a first function, and the latter function is referred to as a second function below). The distribution ratio-and-coefficient computation unit 32 obtains the coefficient Ks by using the first function at time of GL=0, and obtains the coefficient Ks by using the second function at time of GL=2. The second function is defined by using a function Ks=1/{1−WRs(1−S)} as an auxiliary function. The second function is expressed as Ks=Kh/{1−WRs(1−S)} (Kh is a function based on the saturation S) and takes the same value as that in the first function at time of S=0. The second function preferably takes the same value RB as that in the first function at time of S=1.

In a case where the coefficient Ks is obtained by using the first function, when the saturation S is small, and the luminance is high, the amount of the coefficient Ks changing with respect to the amount of the saturation S changing is large (see an H1 portion in FIG. 15). Therefore, in a case where the coefficient Ks is obtained by using the first function, gradation skipping occurs in a display image, and compression noise components and the like which originally have a small luminance difference and have been inconspicuous becomes conspicuous. Thus, noise may occur at a high-luminance portion included in the display image. On the contrary, in a case where the coefficient Ks is obtained by using the second function, even when the saturation S is small and the luminance is high, the amount of the coefficient Ks changing with respect to the amount of the saturation S changing is small (see an H2 portion in FIG. 15). Thus, if the coefficient Ks is obtained by using the second function, it is possible to suppress an occurrence of gradation skipping occurring in a display image, and to suppress the occurrence of noise occurring at a high-luminance portion included in the display image.

As described above, in the image display device according to the embodiment, at time of GL>0, for each pixel, the image data conversion unit 30 obtains the distribution ratio WRs, the tentative coefficient Ks', and the correction coefficient Kh decreasing as the saturation S becomes greater, based on the saturation S. The image data conversion unit outputs a result obtained by multiplying the tentative coefficient Ks' by the correction coefficient Kh, as the coefficient Ks. Thus, according to the image display device according to the embodiment, it is possible to suppress the occurrence of noise occurring at the high-luminance portion.

Fourth Embodiment

Figure 16:
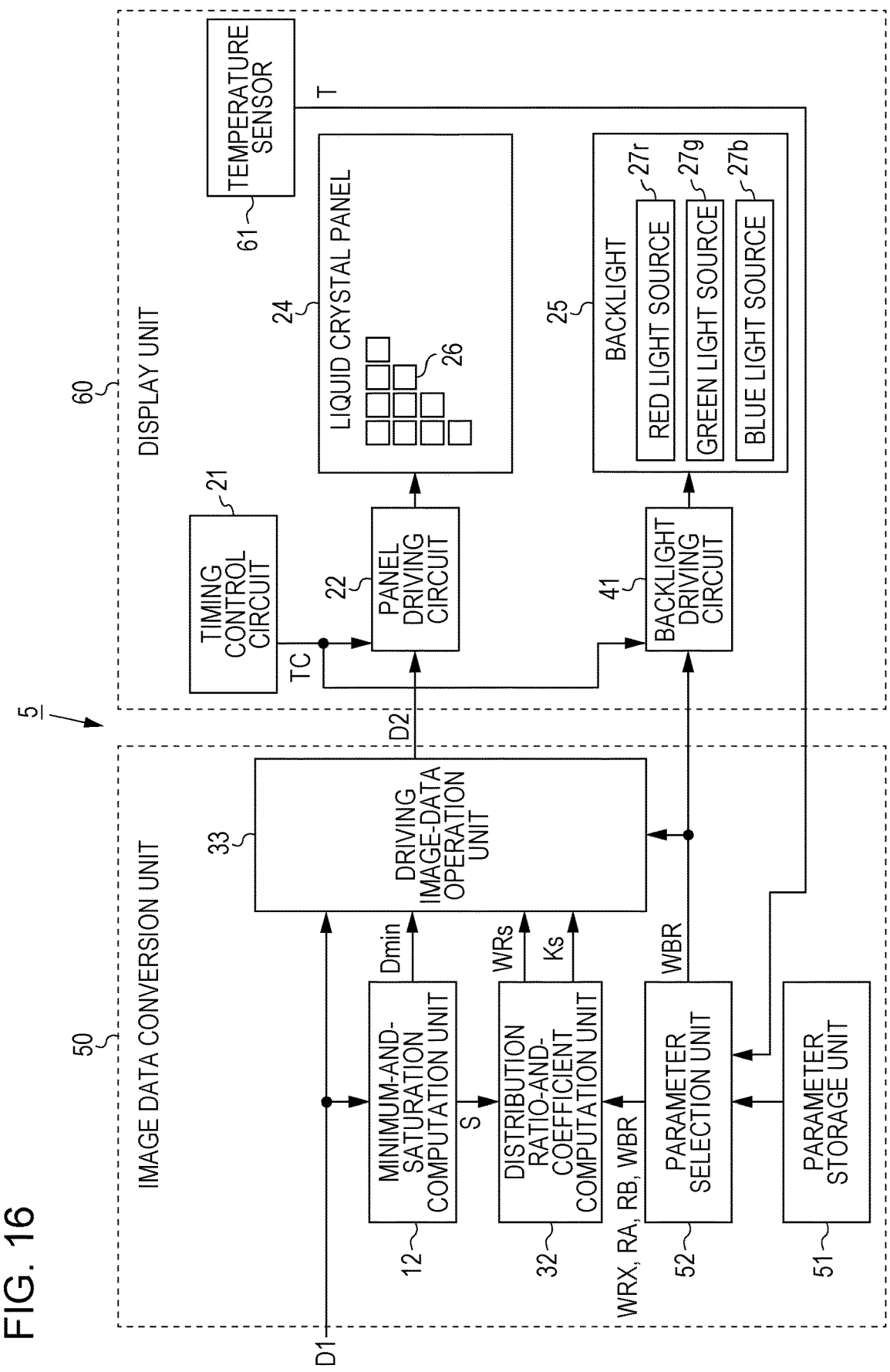
FIG. 16 is a block diagram illustrating a configuration of an image display device according to a fourth embodiment.

FIG. 16 is a block diagram illustrating a configuration of an image display device according to a fourth embodiment. An image display device 5 illustrated in FIG. 16 includes an image data conversion unit 50 and a display unit 60. The image data conversion unit 50 is obtained by adding a parameter selection unit 52 to the image data conversion unit 30 according to the second embodiment and replacing the parameter storage unit 31 with a parameter storage unit 51. The display unit 60 is obtained by adding a temperature sensor 61 to the display unit 40 according to the second embodiment. Differences from the second embodiment will be described below.

The temperature sensor 61 is provided in the display unit 60 and measures the temperature T of the display unit 60. The temperature sensor 61 is provided, for example, in the vicinity of the liquid crystal panel 24. The temperature T measured by the temperature sensor 61 is input to the parameter selection unit 52.

The parameter storage unit 51 stores a plurality of values for the parameters WRX, RA, RB, and WBR, in accordance with the temperature. The parameter selection unit 52 selects values from the plurality of values stored in the parameter storage unit 51, in accordance with the temperature T measured by the temperature sensor 61. Then, the parameter selection unit outputs the selected values as the parameters WRX, RA, RB, and WBR. The parameters WRX, RA, RB, and WBR output from the parameter selection unit 52 are input to the distribution ratio-and-coefficient computation unit 32 and the backlight driving circuit 41.

As described above, in the image display device 5 according to the embodiment, the image data conversion unit 50 includes the parameter storage unit 51 that stores the parameters WRX, RA, RB, and WBR used in conversion processing (image-data conversion processing). The display unit 60 includes the temperature sensor 61. The parameter storage unit 51 stores the plurality of values for the parameters WRX, RA, RB, and WBR in accordance with the temperature. The image data conversion unit 50 selects values depending on the temperature T measured by the temperature sensor 61, among the plurality of values stored in the parameter storage unit 51. The selected values are used in the conversion processing. Thus, according to the image display device 5, the conversion processing is performed based on the parameters WRX, RA, RB, and WBR in accordance with the temperature T of the display unit 60. Accordingly, it is possible to improve color reproduction even in a case where the response characteristics of the display unit 60 change depending on the temperature.

Fifth Embodiment

Figure 17:
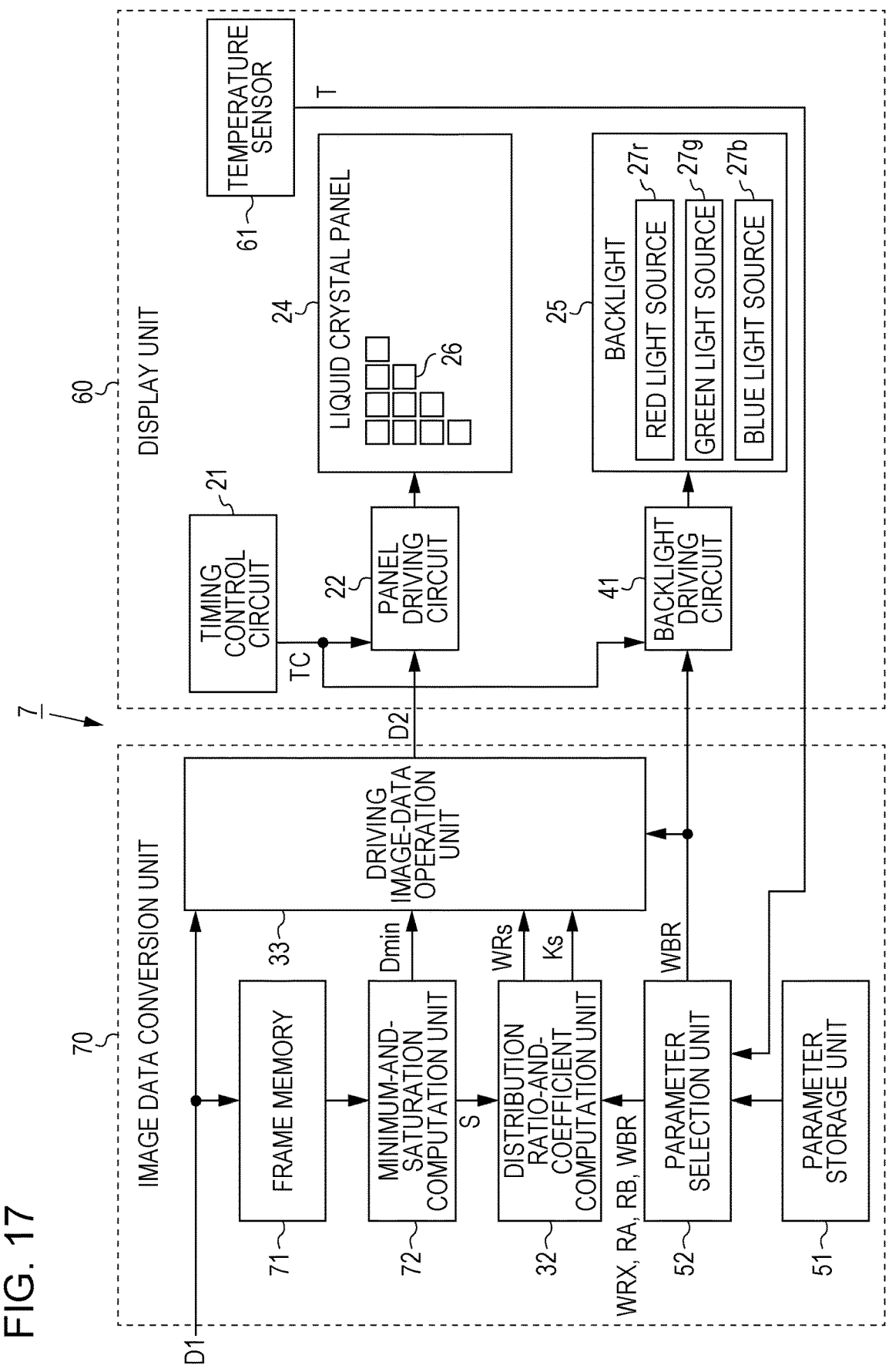
FIG. 17 is a block diagram illustrating a configuration of an image display device according to a fifth embodiment.

FIG. 17 is a block diagram illustrating a configuration of an image display device according to a fifth embodiment. An image display device 7 illustrated in FIG. 17 includes an image data conversion unit 70 and the display unit 60. The image data conversion unit 70 is obtained by adding a frame memory 71 to the image data conversion unit 50 according to the fourth embodiment and replacing the minimum value-and-saturation computation unit 12 with a minimum value-and-saturation computation unit 72. Differences from the fourth embodiment will be described below.

Input image data D1 including red image data, green image data, and blue image data is input to the image display device 7. The frame memory 71 stores input image data D1 corresponding to one frame or a plurality of frames.

Similar to the minimum value-and-saturation computation unit 12, the minimum value-and-saturation computation unit 72 obtains the maximum value Dmax, the minimum value Dmin, and the saturation S based on the input image data D1, for each pixel. At this time, the minimum value-and-saturation computation unit 72 obtains, for each pixel, the maximum value Dmax, the minimum value Dmin, and the saturation S based on the input image data D1 which has been stored in the frame memory 71 and corresponds to a plurality of pixels.

For example, when obtaining the saturation S of a certain pixel, the minimum value-and-saturation computation 72 may obtain the saturation for a plurality of pixels in the vicinity of this pixel, and obtain an average value, the maximum value, or the minimum value of a plurality of saturations which have been obtained. The minimum value-and-saturation computation unit 72 may perform weighting to the saturation in the neighboring pixel, in accordance with a distance or the like from the neighboring pixel and then perform calculation. Thus, since the saturation S is smoothly changed in a spatial direction or the value of the coefficient Ks in accordance with the saturation S is reduced, it is possible to reduce disharmony of an image, which occurs by a luminance difference varying depending on the saturation S. The minimum value-and-saturation computation unit 72 may obtain the saturation S by applying a filter operation to the saturation obtained for the previous frame and the saturation obtained for the current frame. The minimum value-and-saturation computation unit 72 may perform weighting to the saturation of the previous frame in accordance with a time difference or the like from the current frame, and then perform calculation. Thus, since the saturation S is smoothly changed in a time direction or the value of the coefficient Ks in accordance with the saturation S is reduced, it is possible to reduce disharmony of an image, which occurs by a luminance difference in the time direction, which varies depending on the saturation S. The minimum value-and-saturation computation unit 72 obtains the maximum value Dmax and the minimum value Dmin with the similar methods.

As described above, in the image display device 7 according to the embodiment, the image data conversion unit 70 includes the frame memory 71 that stores first image data (input image data D1), and performs conversion processing based on the first image data corresponding to a plurality of pixels stored in the frame memory 71, for each pixel. Thus, according to the image display device 7, it is possible to prevent a rapid change of the distribution ratio WRs and the coefficient Ks and to prevent an occurrence of a situation in which the color of a pixel 26 rapidly changes in the spatial direction or the time direction.

Figure 18:
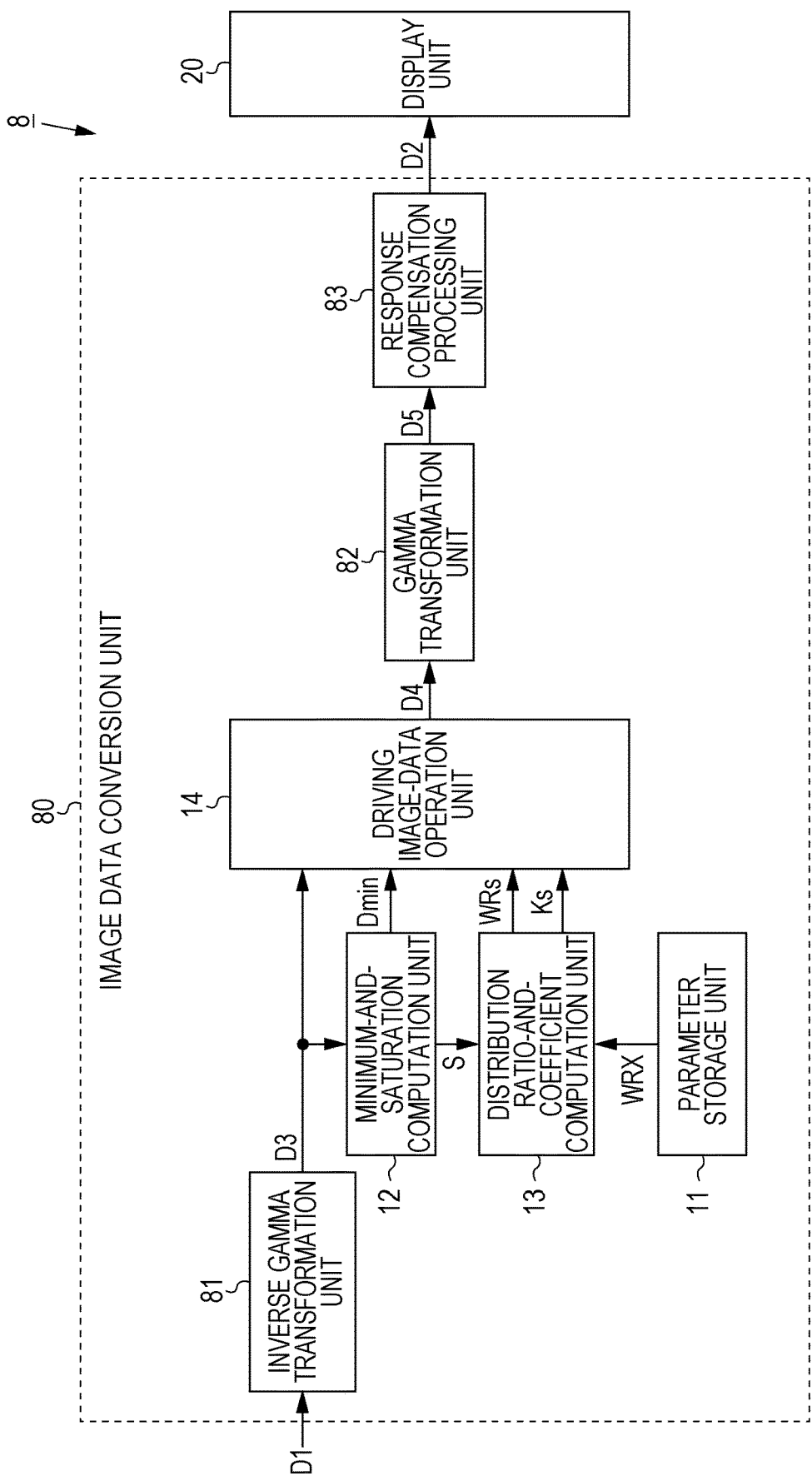
FIG. 18 is a block diagram illustrating a configuration of an image display device according to a modification example of the first embodiment.

Regarding the image display device in the embodiments, the following modification example can be made. FIG. 18 is a block diagram illustrating a configuration of an image display device according to the modification example of the first embodiment. In an image display device 8 illustrated in FIG. 18, an image data conversion unit 80 is obtained by adding an inverse gamma transformation unit 81, a gamma transformation unit 82, and a response compensation processing unit 83 to the image data conversion unit 10 according to the first embodiment.

Input image data D1 to be input to the image display device 8 is gradation data before inverse gamma transformation is performed. The inverse gamma transformation unit 81 performs inverse gamma transformation on the input image data D1 so as to obtain image data D3 after inverse gamma transformation. The parameter storage unit 11, the minimum value-and-saturation computation unit 12, the distribution ratio-and-coefficient computation unit 13, and the driving image-data operation unit 14 perform kinds of processing similar to those in the first embodiment, on the image data D3 after the inverse gamma transformation, respectively. Thus, image data D4 before gamma transformation is obtained. The gamma transformation unit 82 performs gamma transformation on the image data D4 before the gamma transformation, so as to obtain image data D5. The response compensation processing unit 83 performs response compensation processing on the image data D5 so as to obtain driving image data D2. In the response compensation processing unit 83, overdrive processing (also released to as overshoot processing) of compensating for insufficiency of the response rate of a pixel 26.

In the image display device 8 according to the modification example, the image data conversion unit 80 obtains driving image data D2 in a manner that conversion processing (image-data conversion processing) of converting first image data (image data D3 after the inverse gamma transformation) corresponding to a plurality of color components into second image data (image data D4 before the gamma transformation) corresponding to a plurality of subframes is performed for each pixel, and response compensation processing is performed on image data D5 after the conversion processing has been performed. Thus, according to the image display device 8, it is possible to display a desired image even in a case where the response rate of the display unit 60 is slow.

The image data conversion unit 80 includes the inverse gamma transformation unit 81, the gamma transformation unit 82, and the response compensation processing unit 83. Instead, the image data conversion unit may include the inverse gamma transformation unit 81 and the gamma transformation unit 82, but may not include the response compensation processing unit 83. Alternatively, the image data conversion unit may include the response compensation processing unit 83, but may not include the inverse gamma transformation unit 81 and the gamma transformation unit 82. At least one of the inverse gamma transformation unit 81 and the gamma transformation unit 82, and the response compensation processing unit 83 may be added to the image data conversion unit according to the second to fifth embodiments. The gamma transformation may be performed after the response compensation processing. In this case, the response compensation processing is performed on image data output from the driving image-data operation unit. The gamma transformation is performed on image data after the response compensation processing.

In the first, second, fourth, and fifth embodiments, the distribution ratio-and-coefficient computation unit obtains the coefficient Ks so as to satisfy the expression (9), and thus the expression of RB=1−RA is satisfied (see FIG. 6). Instead, the distribution ratio-and-coefficient computation unit may obtain the coefficient Ks such that the minimum value DDmin and the maximum value DDmax are in a certain limited range which has been set in a range satisfying $0 \leq DDmin \leq 1$ and $0 \leq DDmax \leq 1$. For example, the border of the limited range illustrated in FIG. 6 is a straight line. However, in a case where high-luminance noise handling has been performed in the third to fifth embodiments, the border of the limited range may be a curved line which is consequently realized as the limited range or may be a polygonal line having a curved point. Here, the border of the limited range is preferably a straight line or a curved line.

Hitherto, the image display devices according to the first to fifth embodiments and the modification example are described. However, the features of the image display devices according to the first to fifth embodiments and the modification example may be randomly combined so long as a combination does not contradict the properties thereof, and thus image display devices according to various modification examples may be made. For example, the features of the image display devices according to the fourth and fifth embodiments may be added to the image display device according to the first embodiment. As the similar image display device, a field sequential type image display device other than a liquid crystal display apparatus, a see-through image display device having a function of seeing through the back of the display panel, or the like may be configured.

As described above, a field sequential type image display device may include an image data conversion unit that obtains driving image data corresponding to a plurality of subframes including a common color subframe, based on input image data corresponding to a plurality of color components, and a display unit that displays the plurality of subframes based on the driving image data, in one frame period. The image data conversion unit may perform conversion processing of converting first image data corresponding to the plurality of color components into second image data corresponding to the plurality of subframes, for each pixel. The conversion processing may be performed in a manner that, for each pixel, a hue and a saturation of the first image data and a hue and a saturation of the second image data in an HSV color space are held to be respectively equal to each other, color components of the second image data are set to have the same value when the saturation of the first image data is equal to the minimum saturation, and, when the saturation is equal to the maximum saturation, the color components of the first image data are multiplied by the same value, and then the first image data is compressed (first aspect).

The image data conversion unit may obtain a distribution ratio indicating a value to be distributed to the common color subframe and a coefficient used in amplification and compression processing, and performs the conversion processing using the distribution ratio and the coefficient. The image data conversion unit may obtain the distribution ratio based on the saturation for each pixel, such that the second image data corresponding to the common color subframe is in a range from the minimum value of the second image data corresponding to other subframes to the maximum value thereof (second aspect). The image data conversion unit may obtain the distribution ratio and the coefficient in accordance with functions having a value which smoothly changes depending on the saturation (third aspect). In the conversion processing, a range of the maximum value of the second image data in one frame period may be determined in accordance with the minimum value of the second image data in the one frame period (fourth aspect). The display unit may include a light source and control a luminance of the light source when displaying the common color subframe (fifth aspect).

The image data conversion unit may obtain the distribution ratio, a tentative coefficient, and a correction coefficient decreasing as the saturation increases, based on the saturation, and obtain a result obtained by multiplying the tentative coefficient by the correction coefficient, as the coefficient, for each pixel (sixth aspect). The display unit may include a light source and control a luminance of the light source when displaying the common color subframe (seventh aspect).

The image data conversion unit may obtain the distribution ratio increasing as the saturation increases, for each pixel (eighth aspect). In the conversion processing, a range of the maximum value of the second image data in one frame period may be determined in accordance with the minimum value of the second image data in the one frame period (ninth aspect). The display unit may include a light source and control a luminance of the light source when displaying the common color subframe (tenth aspect). The image data conversion unit may obtain the distribution ratio, a tentative coefficient, and a correction coefficient decreasing as the saturation increases, based on the saturation, and obtain a result obtained by multiplying the tentative coefficient by the correction coefficient, as the coefficient, for each pixel (11th aspect). The display unit may include a light source and control a luminance of the light source when displaying the common color subframe (12th aspect).

The image data conversion unit may include a parameter storage unit that stores a parameter used in the conversion processing. The parameter storage unit may store a first parameter in accordance with response characteristics of a pixel provided in the display unit (13th aspect). The parameter storage unit may further store a second parameter for designating a range of the maximum value of the second image data in one frame period in accordance with the minimum value of the second image data in the one frame period (14th aspect). The parameter storage unit may further store a third parameter for designating a luminance of a light source provided in the display unit of when the common color subframe is displayed. The display unit may control the luminance of the light source in accordance with the third parameter when displaying the common color subframe (15th aspect).

The image data conversion unit may store a parameter storage unit that stores a parameter used in the conversion processing. The display unit may include a temperature sensor. The parameter storage unit may store a plurality of values for the parameter, in accordance with a temperature. The image data conversion unit may select the value in accordance with the temperature measured by the temperature sensor among the plurality of values stored in the parameter storage unit and use the selected value in the conversion processing (16th aspect). The image data conversion unit may include a frame memory that stores the first image data, and perform the conversion processing for each pixel, based on pieces of the first image data, which have been stored in the frame memory and correspond to a plurality of pixels (17th aspect).

The image data conversion unit may perform the conversion processing on normalized luminance data (18th aspect). The image data conversion unit may obtain the driving image data by performing response compensation processing on image data obtained after the conversion processing (19th aspect). The input image data may correspond to red, green, and blue. The driving image data may correspond to red, green, blue, and white subframes. The common color subframe may be a white subframe (20th aspect).

A field sequential type image display method may include a step of obtaining driving image data corresponding to a plurality of subframes including a common color subframe, based on input image data corresponding to a plurality of color components and a step of displaying the plurality of subframes based on the driving image data, in one frame period. In the step of obtaining the driving image data, conversion processing of converting first image data corresponding to the plurality of color components into second image data corresponding to the plurality of subframes may be performed for each pixel. The conversion processing may be performed in a manner that, for each pixel, a hue and a saturation of the first image data and a hue and a saturation of the second image data in an HSV color space are held to be respectively equal to each other, color components of the second image data are set to have the same value when the saturation of the first image data is equal to the minimum saturation, and, when the saturation is equal to the maximum saturation, the color components of the first image data are multiplied by the same value, and then the first image data is compressed (21st aspect).

According to the first or 21st aspect, in the field sequential type image display device, while hues of image data before conversion and image data after the conversion are held to have the same value, and saturations of the image data before the conversion and image data after the conversion are held to have the same value, the color components of the image data after the conversion are set to have the same value when the saturation is the minimum, and, when the saturation is the maximum, the image data before the conversion is multiplied by the same value, and then the image data is compressed. Thus, it is possible to suitably limit a range of the image data and to improve color reproduction.

According to the second aspect, the distribution ratio is obtained such that the second image data corresponding to the common color subframe is in a range from the minimum value of the second image data corresponding to other subframes to the maximum value thereof. Thus, it is possible to suppress the change of image data after conversion in one frame period and to improve color reproduction. According to the third aspect, the distribution ratio and the coefficient are obtained by the functions which smoothly change depending on the saturation. Thus, it is possible to prevent the occurrence of distortion of an image when a gradation image is displayed.

According to the fourth or ninth aspect, the range of maximum value of the second image data in one frame period is determined in accordance with the minimum value of the second image data in one frame period. Thus, it is possible to suppress the change of the image data after the conversion in one frame period and to improve color reproduction. According to the fifth, seventh, tenth, or 12th aspect, the luminance of the light source of when a common color subframe is displayed is controlled. Thus, it is possible to reduce heat generated by the light source.

According to the sixth or 11th aspect, the distribution ratio, the tentative coefficient, and the correction coefficient decreasing as the saturation becomes greater are obtained, and the result obtained by multiplying the tentative coefficient by the correction coefficient is obtained as the coefficient. Thus, it is possible to suppress the occurrence of noise occurring at a high-luminance portion. According to the eighth aspect, the distribution ratio increasing as the saturation becomes greater is obtained. Thus, it is possible to suppress an occurrence of color breakup by increasing a ratio of a value distributed to a common color subframe as the saturation becomes greater.

According to the 13th aspect, it is possible to improve color reproduction by setting the suitable first parameter in accordance with the response characteristics of the display unit. According to the 14th aspect, the maximum value of driving image data in one frame period is limited in accordance with the minimum value of the driving image data in one frame period, by using the second parameter. Thus, it is possible to improve color reproduction. According to the 15th aspect, the luminance of the light source of when a common color subframe is displayed is controlled by using the third parameter. Thus, it is possible to reduce heat generated by the light source.

According to the 16th aspect, the conversion processing is performed based on the parameter in accordance with the temperature of the display unit. Thus, it is possible to improve color reproduction even in a case where the response characteristics of the display unit change in accordance with the temperature. According to the 17th aspect, the conversion processing is performed based on the first image data corresponding to the plurality of pixels. Thus, it is possible to prevent the occurrence of a situation in which the color of a pixel rapidly changes in the spatial direction or the time direction.

According to the 18th aspect, the conversion processing is performed on normalized luminance data. Thus, it is possible to accurately perform the conversion processing. According to the 19th aspect, the response compensation processing is performed on image data after the conversion processing has been performed. Thus, it is possible to display a desired image even in a case where the response rate of the display unit is slow. According to the 20th aspect, in the image display device that displays subframes of three primary colors and the white color based on input image data corresponding to the three primary colors, it is possible to improve color reproduction.

This application claims priority right based on Japanese Patent Application No. 2016-88210 entitled "field-sequential image display device and image display method" filed on Apr. 26, 2016, and the contents of this application are included in the present application by reference.

REFERENCE SIGNS LIST 1, 3, 5, 7, 8 . . . IMAGE DISPLAY DEVICE
10, 30, 50, 70, 80 . . . IMAGE DATA CONVERSION UNIT
11, 31, 51 . . . PARAMETER STORAGE UNIT
12, 72 . . . MINIMUM VALUE-AND-SATURATION COMPUTATION UNIT
13, 32 . . . DISTRIBUTION RATIO-AND-COEFFICIENT COMPUTATION UNIT
14, 33 . . . DRIVING IMAGE-DATA OPERATION UNIT
20, 40, 60 . . . DISPLAY UNIT
21 . . . TIMING CONTROL CIRCUIT
22 . . . PANEL DRIVING CIRCUIT
23, 41 . . . BACKLIGHT DRIVING CIRCUIT
24 . . . LIQUID CRYSTAL PANEL
25 . . . BACKLIGHT
26 . . . PIXEL
27 . . . LIGHT SOURCE
52 . . . PARAMETER SELECTION UNIT
61 . . . TEMPERATURE SENSOR
71 . . . FRAME MEMORY
81 . . . INVERSE GAMMA TRANSFORMATION UNIT
82 . . . GAMMA TRANSFORMATION UNIT
83 . . . RESPONSE COMPENSATION PROCESSING UNIT

The invention claimed is:

1. An image display device of a field sequential type, the device comprising:
    image data conversion circuitry that obtain driving image data corresponding to a plurality of subframes including a common color subframe based on input image data corresponding to a plurality of color components; and a display unit that displays the plurality of subframes based on the driving image data, in one frame period, wherein the image data conversion circuitry perform conversion processing of converting first image data corresponding to the plurality of color components into second image data corresponding to the plurality of subframes, for each pixel, and the conversion processing is performed in a manner that, for each pixel, a hue and a saturation of the first image data and a hue and a saturation of the second image data in an HSV color space are held to be respectively equal to each other, color components of the second image data are set to have a same value when the saturation of the first image data is equal to a minimum saturation, and, when the saturation is equal to a maximum saturation, the color components of the first image data are multiplied by a same value, and then the first image data is compressed.

2. The image display device according to claim 1, wherein the image data conversion circuitry obtain a distribution ratio indicating a value to be distributed to the common color subframe and a coefficient used in amplification and compression processing, and performs the conversion processing using the distribution ratio and the coefficient, and the image data conversion circuitry obtain the distribution ratio based on the saturation for each pixel, such that the second image data corresponding to the common color subframe is in a range from a minimum value of the second image data corresponding to other subframes to a maximum value of the second image data corresponding to other sub frames.

3. The image display device according to claim 2, wherein the image data conversion circuitry obtain the distribution ratio and the coefficient in accordance with functions having a value which smoothly changes depending on the saturation.

4. The image display device according to claim 3, wherein, in the conversion processing, a range of the maximum value of the second image data in one frame period is determined in accordance with the minimum value of the second image data in the one frame period.

5. The image display device according to claim 4, wherein the display unit includes a light source and controls a luminance of the light source when displaying the common color subframe.

6. The image display device according to claim 3, wherein, for each pixel, the image data conversion circuitry obtain the distribution ratio, a tentative coefficient, and a correction coefficient decreasing as the saturation increases, based on the saturation, and obtain a result obtained by multiplying the tentative coefficient by the correction coefficient, as the coefficient.

7. The image display device according to claim 6, wherein the display unit includes a light source and controls a luminance of the light source when displaying the common color subframe.

8. The image display device according to claim 2, wherein the image data conversion circuitry obtain the distribution ratio increasing as the saturation increases, for each pixel.

9. The image display device according to claim 8, wherein, in the conversion processing, a range of the maximum value of the second image data in one frame period is determined in accordance with the minimum value of the second image data in the one frame period.

10. The image display device according to claim 9, wherein the display unit includes a light source and controls a luminance of the light source when displaying the common color subframe.

11. The image display device according to claim 8, wherein, for each pixel, the image data conversion circuitry obtain the distribution ratio, a tentative coefficient, and a correction coefficient decreasing as the saturation increases, based on the saturation, and obtain a result obtained by multiplying the tentative coefficient by the correction coefficient, as the coefficient.

12. The image display device according to claim 11, wherein the display unit includes a light source and controls a luminance of the light source when displaying the common color subframe.

13. The image display device according to claim 1, wherein the image data conversion circuitry include a parameter memory that stores a parameter used in the conversion processing, and the parameter memory stores a first parameter in accordance with response characteristics of a pixel provided in the display unit.

14. The image display device according to claim 13, wherein the parameter memory further stores a second parameter for designating a range of a maximum value of the second image data in one frame period in accordance with a minimum value of the second image data in the one frame period.

15. The image display device according to claim 14, wherein the parameter memory further stores a third parameter for designating a luminance of a light source provided in the display unit when the common color subframe is displayed, and the display unit controls the luminance of the light source in accordance with the third parameter when displaying the common color subframe.

16. The image display device according to claim 1, wherein the image data conversion circuitry store a parameter memory that stores a parameter used in the conversion processing, the display unit includes a temperature sensor, the parameter memory stores a plurality of values for the parameter in accordance with a temperature, and the image data conversion circuitry select the value in accordance with the temperature measured by the temperature sensor among the plurality of values stored in the parameter memory and uses the selected value in the conversion processing.

17. The image display device according to claim 1, wherein the image data conversion circuitry include a frame memory that stores the first image data and performs the conversion processing for each pixel, based on pieces of the first image data which have been stored in the frame memory and correspond to a plurality of pixels.

18. The image display device according to claim 1, wherein the image data conversion circuitry perform the conversion processing on normalized luminance data.

19. The image display device according to claim 18,
wherein the image data conversion circuitry obtain the driving image data by performing response compensation processing on image data obtained after the conversion processing.

20. The image display device according to claim 1,
wherein the input image data corresponds to red, green, and blue,
the driving image data corresponds to red, green, blue, and white subframes, and
the common color subframe is a white subframe.

21. An image display method of a field sequential type, the method comprising:
a step of obtaining driving image data corresponding to a plurality of subframes including a common color subframe based on input image data corresponding to a plurality of color components; and
a step of displaying the plurality of subframes based on the driving image data, in one frame period,
wherein, in the step of obtaining the driving image data, conversion processing of converting first image data corresponding to the plurality of color components into second image data corresponding to the plurality of subframes is performed for each pixel, and the conversion processing is performed in a manner that, for each pixel, a hue and a saturation of the first image data and a hue and a saturation of the second image data in an HSV color space are held to be respectively equal to each other, color components of the second image data are set to have a same value when the saturation of the first image data is equal to a minimum saturation, and, when the saturation is equal to a maximum saturation, the color components of the first image data are multiplied by a same value, and then the first image data is compressed.

* * * * *